United States Patent
Min et al.

(10) Patent No.: US 11,133,848 B2
(45) Date of Patent: Sep. 28, 2021

(54) ELECTRONIC DEVICE FOR CONTROLLING COMMUNICATIONS AND METHOD FOR OPERATING SAME

(71) Applicant: Samsung Electronics Co., Ltd., Gyeonggi-do (KR)

(72) Inventors: Hyunkee Min, Gyeongsangbuk-do (KR); Gongbo Moon, Gyeonggi-do (KR); Sunkee Lee, Gyeonggi-do (KR); Taehun Lim, Gyeonggi-do (KR); Minwhoa Hong, Gyeonggi-do (KR); Doosuk Kang, Gyeonggi-do (KR); Chounjong Nam, Gyeonggi-do (KR); Junghun Lee, Gyeonggi-do (KR); Bokun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 16/620,699

(22) PCT Filed: May 23, 2018

(86) PCT No.: PCT/KR2018/005856
§ 371 (c)(1),
(2) Date: Dec. 9, 2019

(87) PCT Pub. No.: WO2018/225966
PCT Pub. Date: Dec. 13, 2018

(65) Prior Publication Data
US 2021/0143880 A1    May 13, 2021

(30) Foreign Application Priority Data
Jun. 9, 2017    (KR) .......................... 10-2017-0072606

(51) Int. Cl.
*H04B 7/06* (2006.01)
*H04B 7/0408* (2017.01)
(Continued)

(52) U.S. Cl.
CPC ......... *H04B 7/0617* (2013.01); *H04B 7/0408* (2013.01); *H04W 36/06* (2013.01); *H04B 7/0404* (2013.01)

(58) Field of Classification Search
None
See application file for complete search history.

(56) References Cited

U.S. PATENT DOCUMENTS 10,236,964 B2 * 3/2019 Andonieh ............ H04B 7/0665
10,477,452 B1 * 11/2019 Jiang .................... H04W 72/046
(Continued)

FOREIGN PATENT DOCUMENTS

| KR | 10-1472132 B1 | 12/2014 | |
| KR | 20150103756 A * | 9/2015 | ............ B01D 29/01 |
| WO | 2016/108589 A1 | 7/2016 | |

OTHER PUBLICATIONS

T. Nitsche, C. Cordeiro, A. B. Flores, E. W. Knightly, E. Perahia and J. C. Widmer, "IEEE 802.11ad: directional 60 GHz communication for multi-Gigabit-per-second Wi-Fi [Invited Paper]," in IEEE Communications Magazine, vol. 52, No. 12, pp. 132-141, Dec. 2014, doi: 10.1109/MCOM.2014.6979964.*

*Primary Examiner* — Berhanu Tadese
(74) *Attorney, Agent, or Firm* — Cha & Reiter, LLC

(57) ABSTRACT

Various embodiments of the present invention relate to an electronic device for controlling communications. The electronic device may comprise: a housing including a first side and a second side facing the first side; a touch screen display exposed through the first side; a wireless communication unit for generating a directional beam in order to establish a (Continued)

wireless communication channel with an external electronic device; a sensor mounted in the housing; at least one processor mounted in the housing and electrically coupled to the display, the wireless communication unit and the sensor; and a memory mounted in the housing and electrically coupled to the at least one processor. The memory according to the various embodiments of the present invention is, when executed, characterized in that the processor is configured to: perform a first direction search for determining the direction of the directional beam corresponding to a first section, wherein the first section falls within a range corresponding to the direction of the electronic device; detect a change in direction of the electronic device by using the wireless communication unit and the sensor; and in response to the change of direction, perform, at least partially, a second direction search corresponding to a second section on the basis of the detected direction change, wherein the second section falls within a range corresponding to the changed direction of the electronic device, and the second section has a smaller range than that of the first section. Other embodiments are possible.

11 Claims, 26 Drawing Sheets

(51) Int. Cl.
*H04W 36/06* (2009.01)
*H04B 7/0404* (2017.01)

(56) References Cited

U.S. PATENT DOCUMENTS

| | | | | |
|---|---|---|---|---|
| 10,484,980 B1* | 11/2019 | Jiang | | H04B 7/0695 |
| 10,932,184 B2* | 2/2021 | Lou | | H04W 48/12 |
| 2013/0329712 A1* | 12/2013 | Cordeiro | | H04W 74/06 370/338 |
| 2015/0103756 A1* | 4/2015 | Sinha | | H04B 7/0491 370/329 |
| 2015/0110071 A1* | 4/2015 | Jo | | H04W 36/0072 370/331 |
| 2015/0230263 A1* | 8/2015 | Roy | | H04W 64/00 455/452.2 |
| 2015/0349863 A1* | 12/2015 | Elayach | | H04B 7/0404 375/295 |
| 2016/0087695 A1* | 3/2016 | Wang | | H04J 11/0063 375/267 |
| 2016/0119043 A1* | 4/2016 | Rajagopal | | H04B 7/086 370/329 |
| 2016/0191132 A1* | 6/2016 | Rajagopal | | H04B 7/088 370/329 |
| 2016/0205501 A1* | 7/2016 | Lee | | H04W 48/16 455/457 |
| 2016/0255660 A1* | 9/2016 | Son | | H04W 76/40 370/329 |
| 2016/0316375 A1* | 10/2016 | Li | | H04W 74/0816 |
| 2017/0034733 A1* | 2/2017 | Sun | | H04L 43/12 |
| 2017/0048775 A1* | 2/2017 | Kim | | H04W 76/18 |
| 2017/0064583 A1* | 3/2017 | Roy | | H04W 36/0009 |
| 2017/0086080 A1* | 3/2017 | Sun | | H04B 7/02 |
| 2017/0086211 A1* | 3/2017 | Sahin | | H04W 48/16 |
| 2017/0111099 A1* | 4/2017 | Jo | | H04B 7/063 |
| 2017/0111806 A1* | 4/2017 | Roh | | H04W 72/042 |
| 2017/0118656 A1* | 4/2017 | Xin | | H04B 7/0695 |
| 2017/0134145 A1* | 5/2017 | Xin | | H04L 5/0048 |
| 2017/0201011 A1* | 7/2017 | Khripkov | | H01Q 1/50 |
| 2017/0289274 A1* | 10/2017 | Levy | | H04W 48/16 |
| 2017/0294705 A1* | 10/2017 | Khripkov | | H01Q 21/24 |
| 2017/0302349 A1* | 10/2017 | Sun | | H04B 7/0695 |
| 2017/0317726 A1* | 11/2017 | Abdallah | | H04B 7/0626 |
| 2017/0352954 A1* | 12/2017 | Abdallah | | H04B 7/088 |
| 2017/0353984 A1* | 12/2017 | Abdallah | | H04B 7/088 |
| 2018/0083679 A1* | 3/2018 | Lim | | H04B 7/0695 |
| 2018/0109303 A1* | 4/2018 | Yoo | | H04W 72/085 |
| 2018/0115305 A1* | 4/2018 | Islam | | H03J 5/242 |
| 2018/0115994 A1* | 4/2018 | Islam | | H04W 74/006 |
| 2018/0123665 A1* | 5/2018 | Oh | | H04B 7/0617 |
| 2018/0145732 A1* | 5/2018 | Shen | | H04B 7/0623 |
| 2018/0146466 A1* | 5/2018 | Shen | | H04W 72/042 |
| 2018/0160424 A1* | 6/2018 | Cavalcanti | | H04B 7/0408 |
| 2018/0191415 A1* | 7/2018 | Aryafar | | H04W 40/244 |
| 2018/0262255 A1* | 9/2018 | Lee | | H04B 7/0695 |
| 2019/0098561 A1* | 3/2019 | Zhou | | H04B 7/0617 |
| 2019/0208463 A1* | 7/2019 | Lou | | H04W 48/12 |
| 2019/0229796 A1* | 7/2019 | Wee | | H04W 72/0446 |
| 2019/0245600 A1* | 8/2019 | Ciochina | | H04B 7/0417 |
| 2019/0260446 A1* | 8/2019 | Oteri | | H04B 7/0695 |
| 2019/0319693 A1* | 10/2019 | Ciochina | | H04B 7/0452 |
| 2019/0349782 A1* | 11/2019 | Kim | | H04W 16/28 |
| 2020/0059950 A1* | 2/2020 | Oteri | | H04W 72/1289 |
| 2020/0067577 A1* | 2/2020 | Lou | | H04W 74/002 |
| 2020/0145853 A1* | 5/2020 | Lou | | H04B 17/309 |
| 2020/0162135 A1* | 5/2020 | Sun | | H04B 17/318 |
| 2020/0204222 A1* | 6/2020 | Lou | | H04B 7/0417 |

* cited by examiner

ELECTRONIC DEVICE FOR CONTROLLING COMMUNICATIONS AND METHOD FOR OPERATING SAME

CROSS REFERENCE TO RELATED APPLICATIONS

This application is a National Phase Entry of PCT International Application No. PCT/KR2018/005856, which was filed on May 23, 2018, and claims a priority to Korean Patent Application No. 10-2017-0072606, which was filed on Jun. 9, 2017, the contents of which are incorporated herein by reference.

TECHNICAL FIELD

Various embodiments of the disclosure relate to a method of controlling communication in an electronic device.

BACKGROUND ART

Recently, research on millimeter wave systems has been conducted. A millimeter wave system can generally refer to a system using extremely high frequencies of 30 to 300 GHz. A system using extremely high frequencies may experience severe radio wave path loss, and may require the application of beam forming techniques. A beamforming technique can increase the transmission and reception efficiency of the antenna by concentrating the transmission and reception power in a narrow space.

For example, IEEE 802.11ad may be a standard technology for a millimeter wave system that can support a wireless transmission rate of several Gbps in an unlicensed frequency band (e.g., 60 GHz). As millimeter wave frequencies are used, the transmission characteristics of radio waves may be degraded because of strong line-of-sight propagation and severe propagation path loss. Hence, a system using millimeter wave frequencies can secure the transmission distance by collecting the energy of radio waves for transmission based on a beamforming technique.

DISCLOSURE OF INVENTION

Technical Problem

In the case of IEEE 802.11ad supporting the millimeter wave band, it is necessary to operate the beamforming protocol in response to changes in the communication environment or user scenario during the process of transmitting and receiving data. For example, an electronic device may transmit and receive data by applying a beamforming technique. In general, when transmitting and receiving data based on a beamforming technique, the electronic device may use a beam tracking protocol to track the beamforming direction while transmitting and receiving data. The beam tracking protocol may utilize beams with a small beam width. If the electronic device is moved or changes its direction while transmitting or receiving data based on a beamforming technology, data transmission and reception performance may be degraded. For example, when the electronic device is moved and the beamforming direction is changed, as the beam width of the beam tracking protocol is small, it may be difficult to rapidly track the changed beamforming direction. As a result, communication performance may be drastically degraded, and data communication may be disconnected.

According to various embodiments of the disclosure, it is possible to provide a method for controlling communication wherein, when a beamforming technique is used for communication, the communication state and sensor information are checked and the beamforming direction is determined based on the communication state information and sensor information.

Solution to Problem

According to various embodiments of the disclosure, there is provided an electronic device. The electronic device may include: a housing including a first surface and a second surface facing the first surface; a touchscreen display exposed through the first surface; a wireless communication circuit configured to generate a directional beam to establish a wireless communication channel with an external electronic device; a sensor embedded in the housing; at least one processor embedded in the housing and electrically connected to the touchscreen display, the wireless communication circuit, and the sensor; and a memory embedded in the housing and electrically connected to the at least one processor. The memory may store instructions that, when executed, cause the processor to: perform a first direction search to determine the direction of the directional beam corresponding to a first section wherein the first section is associated with a range corresponding to the direction of the electronic device; detect a change in the direction of the electronic device by using the wireless communication circuit and the sensor; and perform, upon detecting a change in the direction, a second direction search corresponding to a second section at least partially based on the detected direction change. The second section may be associated with a range corresponding to the changed direction of the electronic device and the second section may be smaller in range than the first section.

According to various embodiments of the disclosure, there is provided a method for communication control. The method may include: performing a first direction search to determine the direction of a directional beam corresponding to a first section associated with a range corresponding to the direction of an electronic device; obtaining communication state information and sensor information; detecting a change in the direction of the electronic device based on the communication state information and sensor information; and performing, upon detecting a change in the direction, a second direction search corresponding to a second section at least partially based on the detected direction change of the electronic device. The second section may be associated with a range corresponding to the changed direction of the electronic device and may be smaller in range than the first section.

Advantageous Effects of Invention

According to various embodiments of the disclosure, the electronic device may support a method for obtaining communication state information and sensor information and selecting a beam width based on the obtained communication state information and sensor information, and a method for rapidly finding the beamforming direction.

According to various embodiments of the disclosure, the electronic device may guarantee the stability and speed of data communication even when the position and direction of the electronic device are changed during data communication.

MODE FOR THE INVENTION

Figure 1:
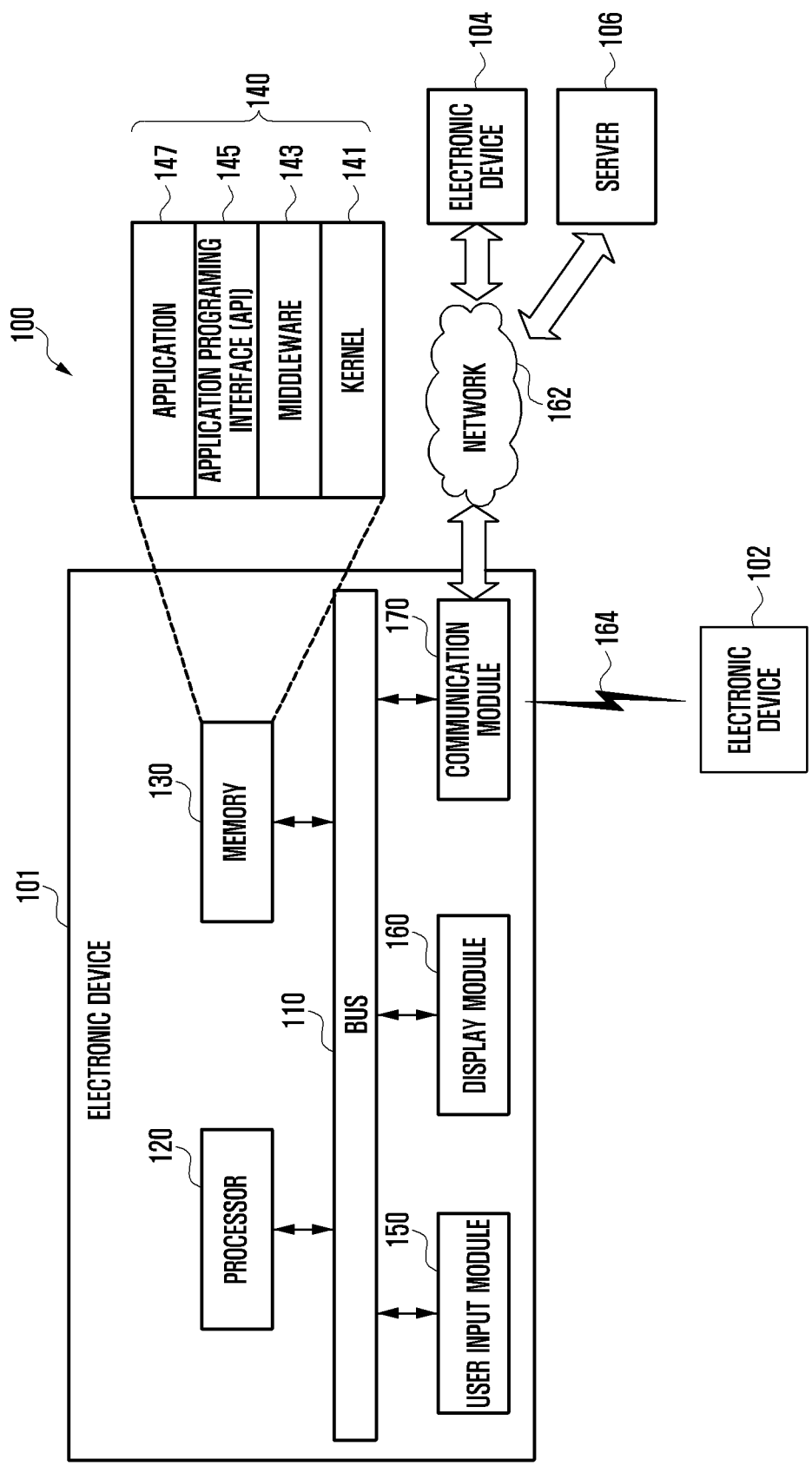
FIG. 1 illustrates an electronic device in a network environment according to various embodiments of the disclosure.

Hereinafter, the present disclosure is described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor) that may execute one or more software programs stored in a memory device to perform corresponding functions.

It should be appreciated that various embodiments of the present disclosure and the terms used therein are not intended to limit the technological features set forth herein to particular embodiments and include various changes, equivalents, or replacements for a corresponding embodiment. Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

An electronic device according to various embodiments of the present invention may be a device including an antenna. For example, the electronic device may be one or more of the following: a smart phone, a tablet Personal Computer (PC), a mobile phone, a video phone, an e-book reader, a desktop PC, a laptop PC, a netbook computer, a Personal Digital Assistant (PDA), Portable Multimedia Player (PMP), MP3 player, a mobile medical application, a camera, and a wearable device (for example, a Head-Mounted-Device (HMD), such as electronic glasses, electronic clothes, an electronic bracelet, an electronic necklace, an electronic appcessary, an electronic tattoo, and a smart watch).

According to some embodiments, the electronic device may be a smart home appliance having an antenna. The smart home appliance may include at least one of the following: a Television (TV), a Digital Video Disk (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of the following: various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of the following: furniture or a part of a building/structure, an electronic board, an electronic signature receiving device, a projector, and various types of measuring devices (for example, a water meter, an electricity meter, a gas meter, a radio wave meter and the like), which are equipped with an antenna. The electronic device according to various embodiments of the present invention may also be a combination of the devices listed above. Further, the electronic device according to various embodiments of the present disclosure may be a flexible device. It is apparent to those skilled in the art that the electronic device according to various embodiments of the present invention is not limited to the above described devices.

Hereinafter, an electronic device according to various embodiments will be discussed with reference to the accompanying drawings. The term se skilled in the art that the electronic device according to various embodiments of the present meter and the e (e.g., an artificial intelligence electronic device) using an electronic device.

FIG. 1 illustrates a network environment 100 including an electronic device 101 according to various embodiments of the present disclosure.

Referring to FIG. 1, the electronic device 101, 102, 104 may connect to the server 106 via the network 162 or short-wireless communication 164.

The electronic device 101 may include a bus 110, a processor 120, a memory 130, an input/output interface 150, a display 160, and a communication interface 170. According to some embodiments, at least one of the above described components may be omitted from the electronic device 101 or another component may be further included in the electronic device 101. The bus 110 may be a circuit connecting the above described components 120, 130, and 150~170 and transmitting communications (e.g., control messages and/or data) between the above described components. The processor 120 is capable of including one or more of the following: a central processing unit (CPU), an application processor (AP), and a communication processor (CP). The processor 120 is capable of controlling at least one of other components of the electronic device 101 and/or processing data or operations related to communication.

The memory 130 is capable of including volatile memory and/or non-volatile memory. The memory 130 is capable of storing data or commands related to at least one of other components of the electronic device 101. According to an embodiment, the memory 130 is capable of storing software and/or a program module 140. For example, the program module 140 is capable of including a kernel 141, middleware 143, application programming interface (API) 145, application programs (or applications) 147, etc. The kernel 141, middleware 143 or at least part of the API 145 may be called an operating system (OS). The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 is capable of mediating between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests. The API 145 refers to an interface configured to allow the application programs 147 to control functions provided by the kernel 141 or the middleware 143. The API 145 is capable of including at least one interface or function (e.g., instructions) for file control, window control, image process, text control, or the like. The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and an external device (e.g., a first external device 102, a second electronic device 104, or a server 106). For example, the communication interface 170 is capable of communicating with an external device (e.g., a second external device 104 or a server 106) connected to the network 162 via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-wireless communication 164. Short-wireless communication 164 may include at least one of the following: wireless fidelity (WiFi), Bluetooth (BT), near field communication (NFC), Magnetic Secure Transmission (MST), and Global Navigation Satellite System (GNSS). The GNSS may include at least one of the following: Global Positioning System (GPS), Global Navigation Satellite System (Glonass), Beidou Navigation Satellite System (hereinafter called 'Beidou"), Galileo, the European global satellite-based navigation system, according to GNSS using areas, bandwidths, etc. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

The first and second external electronic devices 102 and 104 are each identical to or different from the electronic device 101, in terms of type. According to an embodiment, the server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from other electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
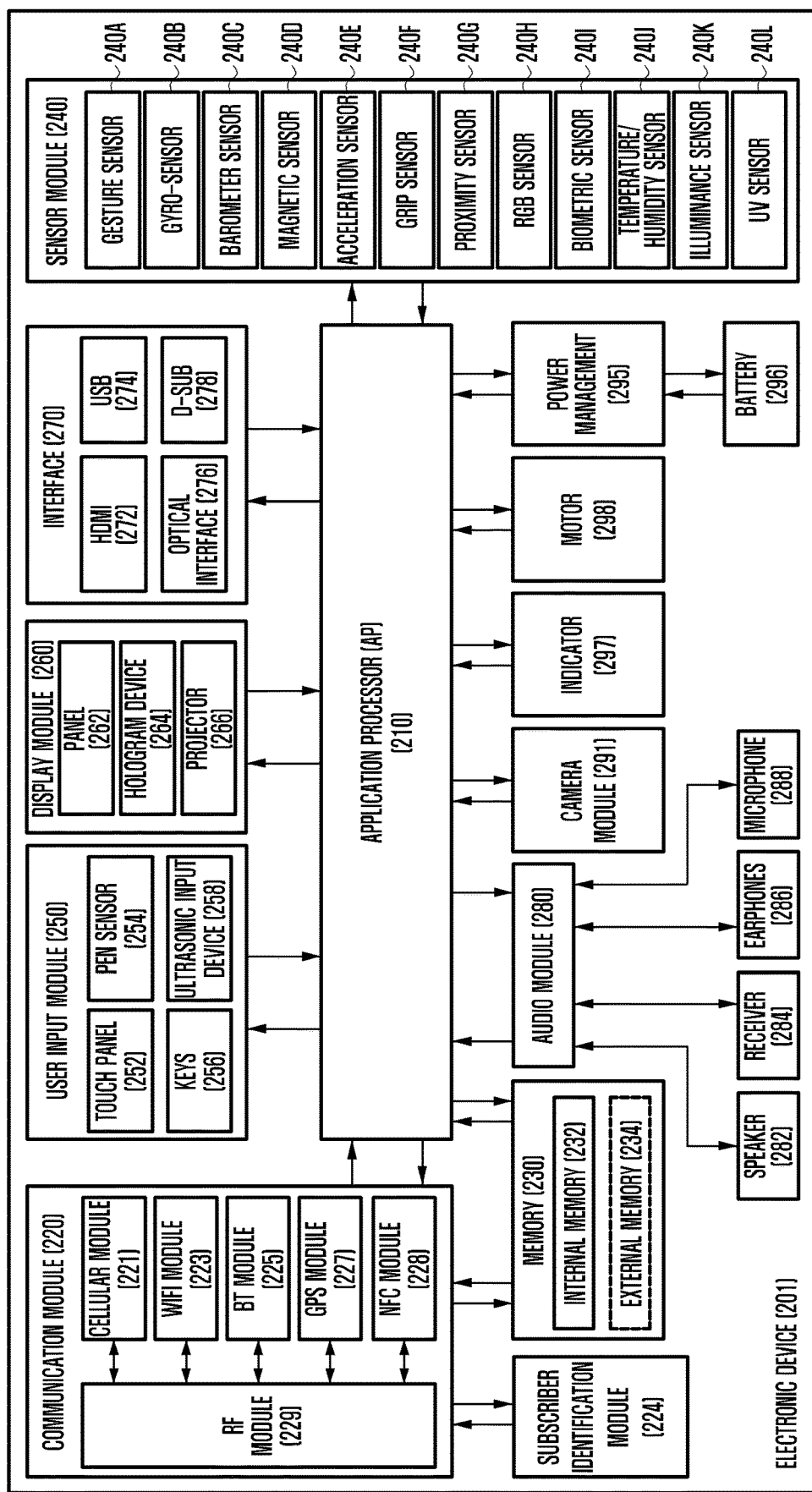
FIG. 2 is a block diagram of an electronic device according to various embodiments of the disclosure.

FIG. 2 is a detailed block diagram showing a configuration of an electronic device 201 according to various embodiments. For example, the electronic device 201 is capable of including part or all of the components in the electronic device 101 shown in FIG. 1. The electronic device 201 is capable of including one or more processors 210 (e.g., Application Processors (APs)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210 is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 170 is capable of including a cellular module 221, WiFi module 223, Bluetooth (BT) module 225, GNSS module 227 (e.g., a GPS module, Glonass module, Beidou module or Galileo module), NFC module 228, and Radio Frequency (RF) module 229. The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 224 (e.g., a SIM card). According to an embodiment, the cellular module 221 is capable of performing at least part of the functions provided by the processor 210. According to an embodiment, the cellular module 221 is also capable of including a communication processor (CP). Each of the WiFi module 223, the BT module 225, the GNSS module 227, and the NFC module 228 is capable of including a processor for processing data transmitted or received through the corresponding module. According to embodiments, at least part of the cellular module 221, WiFi module 223, BT module 225, GNSS module 227, and NFC module 228 (e.g., two or more modules) may be included in one integrated chip (IC) or one IC package. The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 227, and NFC module 228 is capable of transmission/reception of RF signals through a separate RF module.

The SIM module 224 is capable of including a card including a subscriber identification module (SIM) and/or an embodied SIM. The SIM module 224 is also capable of containing unique identification information, e.g., integrated circuit card identifier (ICCID), or subscriber information, e.g., international mobile subscriber identity (IMSI).

The memory 230 (e.g., memory 130 shown in FIG. 1) is capable of including a built-in memory 232 or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc. The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 is capable of including a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266.

The interface 270 is capable of including a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc. The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc. The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3:
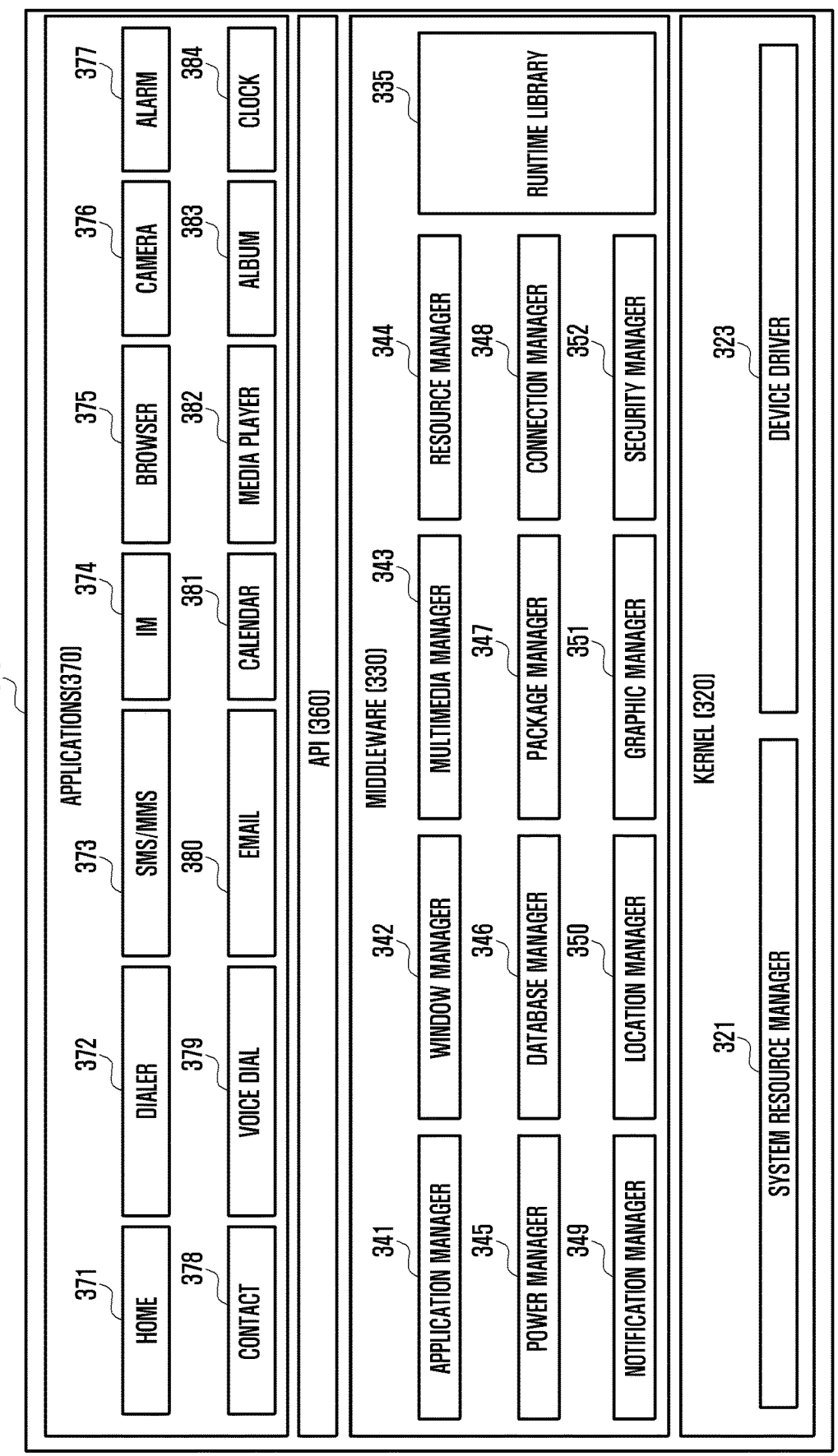
FIG. 3 is a diagram of program modules according to various embodiments of the disclosure.

FIG. 3 is a block diagram of a programming module according to various embodiments. According to an embodiment, the program module 310 (e.g., program module 140 shown in FIG. 1) is capable of including an operation system (OS) for controlling resources related to the electronic device (e.g., electronic device 101) and/or various applications (e.g., application programs 147 shown in FIG. 1) running on the OS. The OS may be Android, iOS, Windows, Symbian, Tizen, Bada, etc. The program module 310 is capable of including a kernel 320, middleware 330, application programming interface (API) 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver. The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment, the runtime library 335 executes input and output, management of a memory, a function associated with an arithmetic function and the like. The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370. The power manager 345 may operate together with a Basic Input/Output System (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function. The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components. The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, diary 372, SMS/MMS 373, instant message (IM) 374, browser 375, camera 376, alarm 377, contact 378, voice dial 379, email 380, calendar 381, media player 382, album 383, clock 384, health care (e.g., an application for measuring amount of exercise, blood sugar level, etc.), and environment information (e.g., an application for providing atmospheric pressure, humidity, temperature, etc.). According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices. For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user. The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc. According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems. According to various embodiments, at least part of the program module 310 can be implemented with software, firmware, hardware, or any combination of two or more of them. At least part of the program module 310 can be implemented (e.g., executed) by a processor (e.g., processor 210). At least part of the programming module 310 may include modules, programs, routines, sets of instructions or processes, etc., in order to perform one or more functions.

Figure 4:
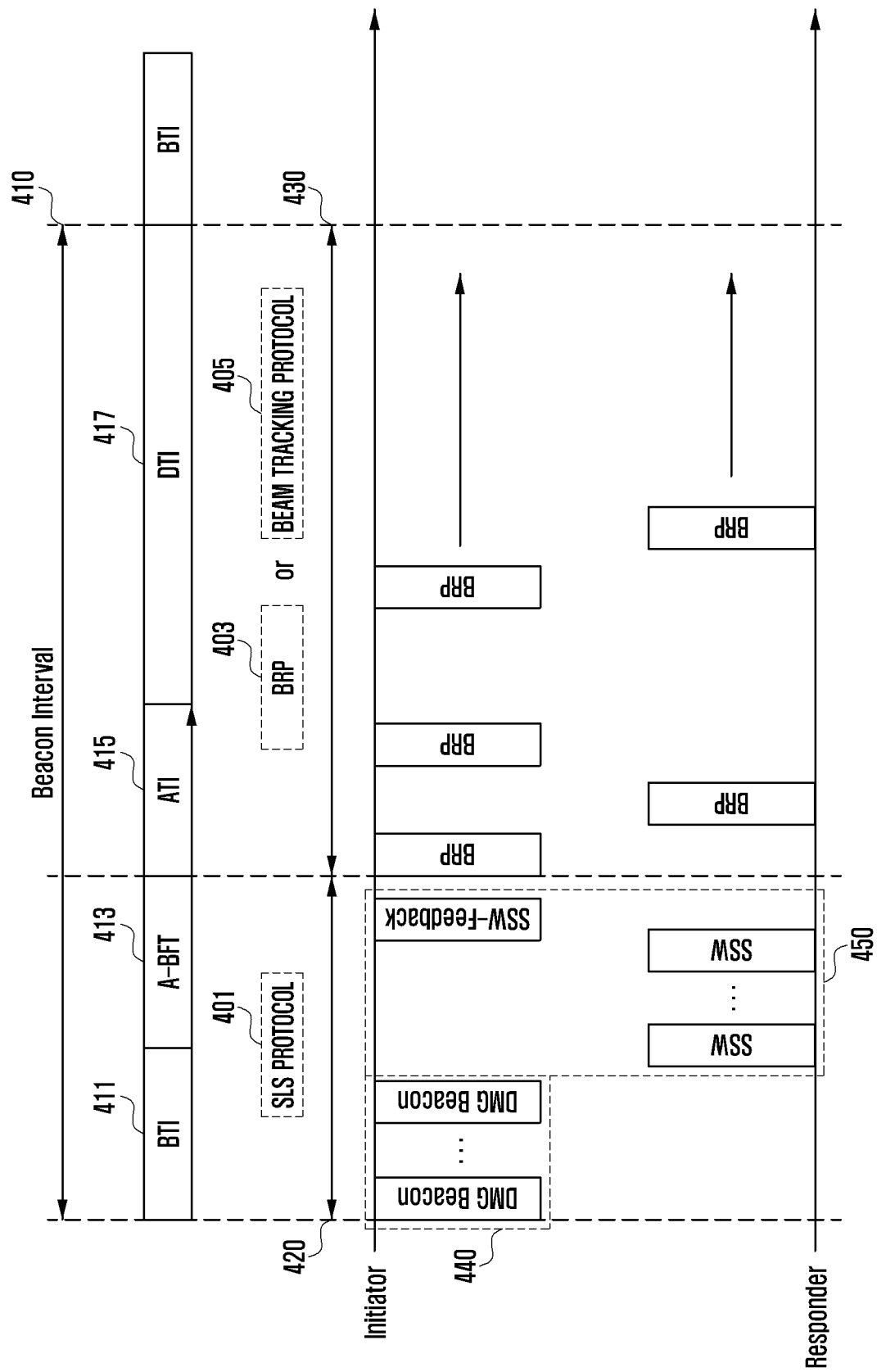
FIG. 4 depicts a process of communication based on a beamforming protocol according to various embodiments of the disclosure.

FIG. 4 depicts a process of communication based on a beamforming protocol according to various embodiments of the disclosure.

FIG. 4 illustrates a process in which the electronic device (e.g., electronic device 101) communicates based on a beamforming protocol. The IEEE 802.11ad standard defines several beamforming protocols. For example, the 802.11ad standard may include various beamforming protocols such as a sector level sweep (SLS) protocol 401, a beam refinement protocol (BRP) 403, or a beam tracking protocol 405. The beamforming protocols of the 802.11ad standard may be selected and used for communication connection and/or data transmission and reception.

For example, the SLS protocol 401 may be used to find a sector corresponding to the beamforming direction. The SLS protocol 401 may transmit a packet including the same information in accordance with various directions set around the electronic device. For instance, based on the SLS protocol 401, the electronic device 101 may transmit a beacon packet as an initiator, and may transmit a sector sweep (SSW) packet as a responder. If there is a successfully received packet among the packets transmitted based on the SLS protocol 401, the electronic device 101 may determine a sector with the best channel performance among various directions (e.g., sectors) set based on the successfully received packet. For example, when the electronic device 101 as the initiator receives a SSW-feedback packet corresponding to at least one SSW packet transmitted from the responder, it may determine at least one sector corresponding to the SSW packet as a sector for beamforming. The electronic device 101 may set at least one sector based on the angle of the electronic device 101 with respect to the electronic device 101. In one embodiment, the electronic device 101 may determine the range of the sector based on the beam width. For example, the electronic device 101 may determine at least one sector among a plurality of sectors divided based on the beam width, and transmit a packet by using the determined sector. The electronic device 101 may find a sector with the best communication performance among plural sectors on the basis of the SLS protocol 401.

The BRP 403 may finely adjust the sector so that the data rate can be maximized based on the sector (sector for beamforming) determined by the SLS protocol 401 or other means. The BRP 403, like the SLS protocol 401, can determine the sector with the best channel performance. For example, the SLS protocol 401 may transmit a packet for each sector and determine a sector with good channel performance based on the transmitted packets. The BRP 403 may include a specific training sequence in a packet and may transmit the packet successively for individual sectors.

The beam tracking protocol 405 may perform data transmission and sector search simultaneously. For example, the beam tracking protocol 405 may include information for sector search in the PHY header of a data packet, and include a sequence for sector search in the data packet, thereby simultaneously performing data transmission and sector search.

FIG. 4 illustrates a process of association and communication between electronic devices supporting IEEE 802.11ad. For two or more electronic devices supporting 802.11ad, the SLS protocol 401, the BRP 403, and the beam tracking protocol 405 may be used for connection establishment and data communication between the electronic devices. With reference to FIG. 4, the electronic device 101 may perform association and data transmission with an external electronic device during a beacon interval 410. The beacon interval 410 may periodically reoccur, and the electronic device 101 may continuously perform data communication.

The beacon interval 410 may be divided into a first interval 420 for using the SLS protocol 401 and a second interval 430 for using the BRP 403 or the beam tracking protocol 405. The first interval 420 may be divided into a beacon transmission interval (BTI) 411 for beacon packet transmission and an association beamforming training (A-BFT) interval 413 for sector search. The second interval 430 may be divided into an announcement transmission interval (ATI) 415 and a data transmission interval (DTI) 417.

In FIG. 4, the electronic device 101 may transmit a beacon packet for each sector by using the SLS protocol 401 in the BTI 411 of the first interval 420 (440). The electronic device 101 may perform sector search by using SSW packets in the A-BFT interval 413 (450). The electronic device 101 may determine a sector with excellent communication performance by performing the above-described operation in the first interval 420. If a sector is determined through the process in the first interval 420, the electronic device 101 may exchange a packet with an external electronic device in a request-response mode by using the BRP 403 in the ATI 415 of the second interval 430. The electronic device 101 may communicate with an external electronic device (e.g., electronic device 102 or 104 in FIG. 1) by using the BRP 403 in the DTI 417 of the second interval 430. The electronic device 101 may exchange data with an external electronic device 102 or 104 by using the beam tracking protocol 405, and may perform additional sector search by using the beam tracking protocol 405 during data transmission and reception.

In various embodiments, the beamforming direction of the electronic device 101 may be changed due to the movement thereof during communication based on beamforming. In response to a change in the beamforming direction, the electronic device 101 may suspend data transmission and rapidly perform sector search. In response to a change in the beamforming direction, the electronic device 101 may adjust the beamforming direction or the beam width.

Figure 5:
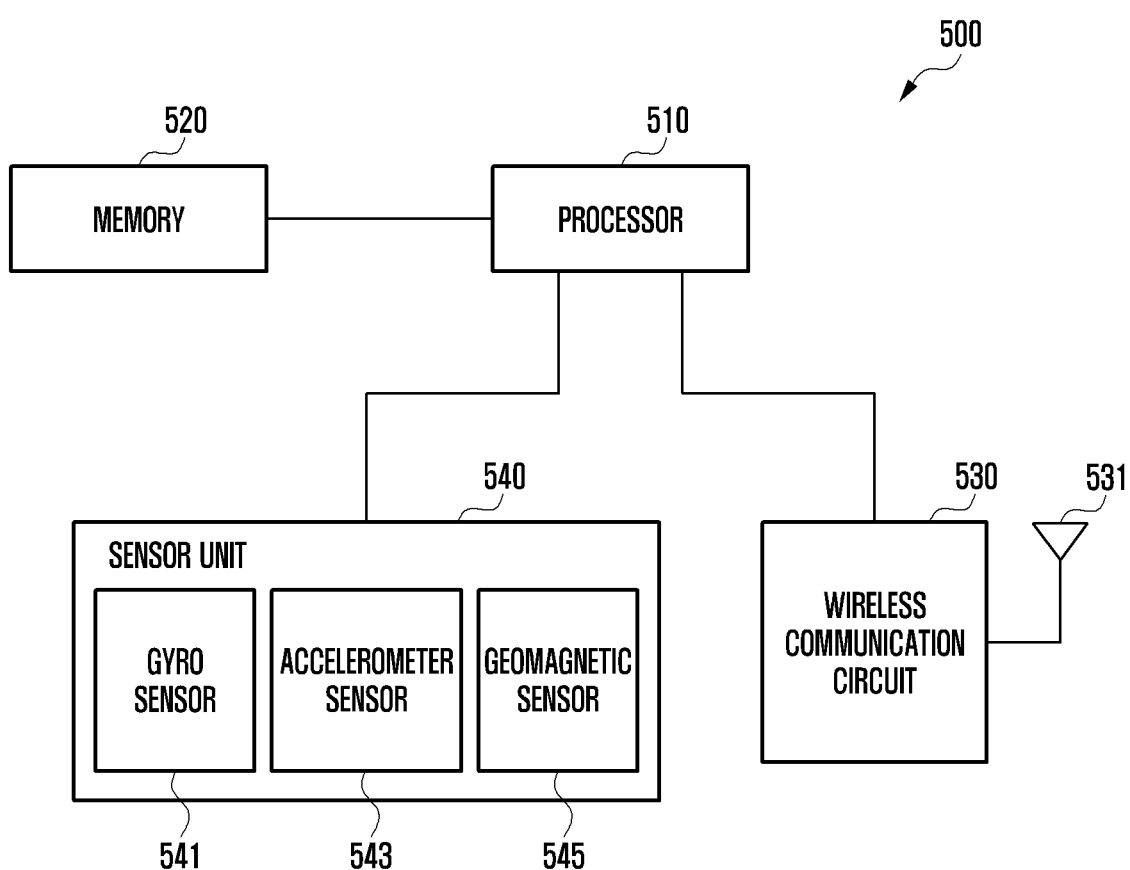
FIG. 5 is a block diagram of an electronic device performing communication based on communication state information and sensor information according to various embodiments of the disclosure.

FIG. 5 is a block diagram of an electronic device performing communication based on communication state information and sensor information according to various embodiments of the disclosure.

With reference to FIG. 5, the electronic device 500 according to various embodiments of the disclosure (e.g., electronic device 101 in FIG. 1, or electronic device 201 in FIG. 2) may include a processor 510 (e.g., processor 120 in FIG. 1, or application processor 210 in FIG. 2), a memory 520 (e.g., memory 130 in FIG. 1, or memory 230 in FIG. 2), a wireless communication circuit 530 (e.g., communication interface 170 in FIG. 1, or communication module 220 in FIG. 2), and a sensor unit 540 (e.g., sensor module 240 in FIG. 2). The processor 510 may execute the operating system or an application program to control a plurality of hardware or software components connected to the processor 510, and may perform various data processing operations and computations. The processor 510 may be implemented in, for example, a system on chip (SoC).

The processor 510 (e.g., processor 120 in FIG. 1) of the electronic device 500 may selectively control the beam width, the power of beamforming, or the direction of beamforming at least partially based on the information obtained through the wireless communication circuit 530 or the sensor unit 520.

The wireless communication circuit 530 of the electronic device 500 may include a channel estimator, a beamforming controller, and a transmission power controller. For example, the channel estimator may identify and estimate a channel corresponding to a preset sector. The beamforming controller may control the beam width and the beam direction under the control of the processor 510. The transmission power controller may control the power of beamforming under the control of the processor 510. In various embodiments, the electronic device 500 may obtain communication state information or related information through the wireless communication circuit 530. The electronic device 500 may perform communication according to the beam width, the beam power, or the beam direction configured through the wireless communication circuit 530.

The wireless communication circuit 530 may perform communication through the antenna 531 included in the electronic device 500. The antenna 531 may be mounted at a front portion, a rear portion, or a side portion of the electronic device 500.

The sensor unit 540 of the electronic device 500 may include a gyro sensor 541, an accelerometer sensor 543, and a geomagnetic sensor 545. The sensor unit 540 may obtain sensor information from these sensors. The sensor unit 540 may act as an inertial measurement sensor for measuring the inertia of the electronic device 500. The electronic device 500 may identify a beamforming search condition or a movement condition for the electronic device 500 at least partially based on the sensor information obtained through the sensor unit 540.

The memory 520 of the electronic device 500 may store instructions for performing the above-described operations. The memory 520 may store information related to the beamforming search condition and the movement condition for the electronic device. For example, the memory 520 may store the above information in a table format.

In various embodiments, the wireless communication circuit 530 may include a processor and a memory independent of the processor 510. For example, when the wireless communication circuit 530 and the sensor unit 540 can transmit and receive data through a wired data bus, the wireless communication circuit 530 may obtain sensor information from the sensor unit 540 and directly perform the operations of the processor 510 described above.

According to various embodiments of the disclosure, the electronic device 500 may include: a housing including a first surface and a second surface facing the first surface; a touchscreen display 260 exposed through the first surface; a wireless communication circuit 530 configured to generate a directional beam to establish a wireless communication channel with an external electronic device; a sensor 540 embedded in the housing; at least one processor 510 embedded in the housing and electrically connected to the touchscreen display, the wireless communication circuit, and the sensor; and a memory 520 embedded in the housing and electrically connected to the at least one processor 510. In various embodiments, the memory 520 may store instructions that, when executed, cause the processor 510 to: perform a first direction search to determine the direction of the directional beam corresponding to a first section wherein the first section is associated with a range corresponding to the direction of the electronic device 500; detect a change in the direction of the electronic device 500 by using the wireless communication circuit 530 and the sensor 540; and perform, upon detecting a change in the direction, a second direction search corresponding to a second section at least partially based on the detected direction change wherein the second section is associated with a range corresponding to the changed direction of the electronic device 500 and the second section is smaller in range than the first section.

In various embodiments, the processor 510 may be configured to monitor the performance of the wireless communication channel and determine whether to perform the second direction search at least partially based on the performance or a change in the performance.

In various embodiments, the wireless communication circuit 530 may be configured to support the IEEE 802.11ad standard.

In various embodiments, the processor 510 may be configured to perform the first direction search during an association beamforming training (A-BFT) interval of a beacon interval specified in the IEEE 802.11ad standard.

In various embodiments, the processor 510 may be configured to perform the second direction search during a data transmission interval (DTI) of a beacon interval specified in the IEEE 802.11ad standard when the direction of the directional beam is out of a preset range.

According to various embodiments of the disclosure, the electronic device 500 may include: a wireless communication circuit 530 configured to generate a directional beam to establish a wireless communication channel with an external electronic device; a sensor unit 540 configured to detect the direction and movement of the electronic device 500; at least one processor 510 electrically connected to the wireless communication circuit 530 and the sensor unit 540; and a memory 520 electrically connected to the at least one processor, and wherein the memory 520 may store instructions that, when executed, cause the processor 510 to: perform a first direction search to determine the direction of the directional beam corresponding to a first section wherein the first section is associated with a range corresponding to the direction of the electronic device 500; detect a change in the direction of the electronic device 500 based on communication state information obtained through the wireless communication circuit 530 and sensor information obtained through the sensor unit 540; perform, upon detecting a change in the direction, a second direction search corresponding to a second section at least partially based on the detected direction change wherein the second section is associated with a range corresponding to the changed direction of the electronic device 500 and is smaller in range than the first section; determine the direction of the directional beam based on the result of the second direction search; and establish the wireless communication channel through the wireless communication circuit 530 based on the determined beam direction.

In various embodiments, the processor 510 may be configured to monitor the performance of the wireless communication channel and determine whether to perform the second direction search at least partially based on the performance or a change in the performance.

In various embodiments, upon determining to perform the second direction search, the processor 510 may be configured to: determine whether it is possible to perform the second direction search during the remaining time of the DTI of a beacon interval specified in the IEEE 802.11ad standard; perform the second direction search during the remaining time of the DTI if possible; and perform the second direction search during the A-BFT interval of the next beacon interval if otherwise.

In various embodiments, in a case where a first condition is satisfied when a change in the direction of the electronic device within the range of the first section is detected and a second condition is satisfied when a change in the direction of the electronic device outside the range of the first section is detected, the processor 510 may be configured to perform, upon satisfaction of the first condition, the second direction search corresponding to the first section at least partially based on the detected direction change.

In various embodiments, upon satisfaction of the second condition, the processor 510 may be configured to: suspend data communication through the wireless communication circuit; perform the second direction search corresponding to the second section; determine the beam direction based on the result of the second direction search; and resume the suspended data communication according to the determined beam direction.

In various embodiments, the width of the directional beam for the first direction search and the second direction search may be set by the user.

In various embodiments, the electronic device 500 may further include a housing, and the first direction search and the second direction search may be performed by using at least one antenna embedded in the housing.

In various embodiments, the second section may be formed corresponding to the peripheral angular velocity with respect to the angular velocity corresponding to the first section.

Figure 6:
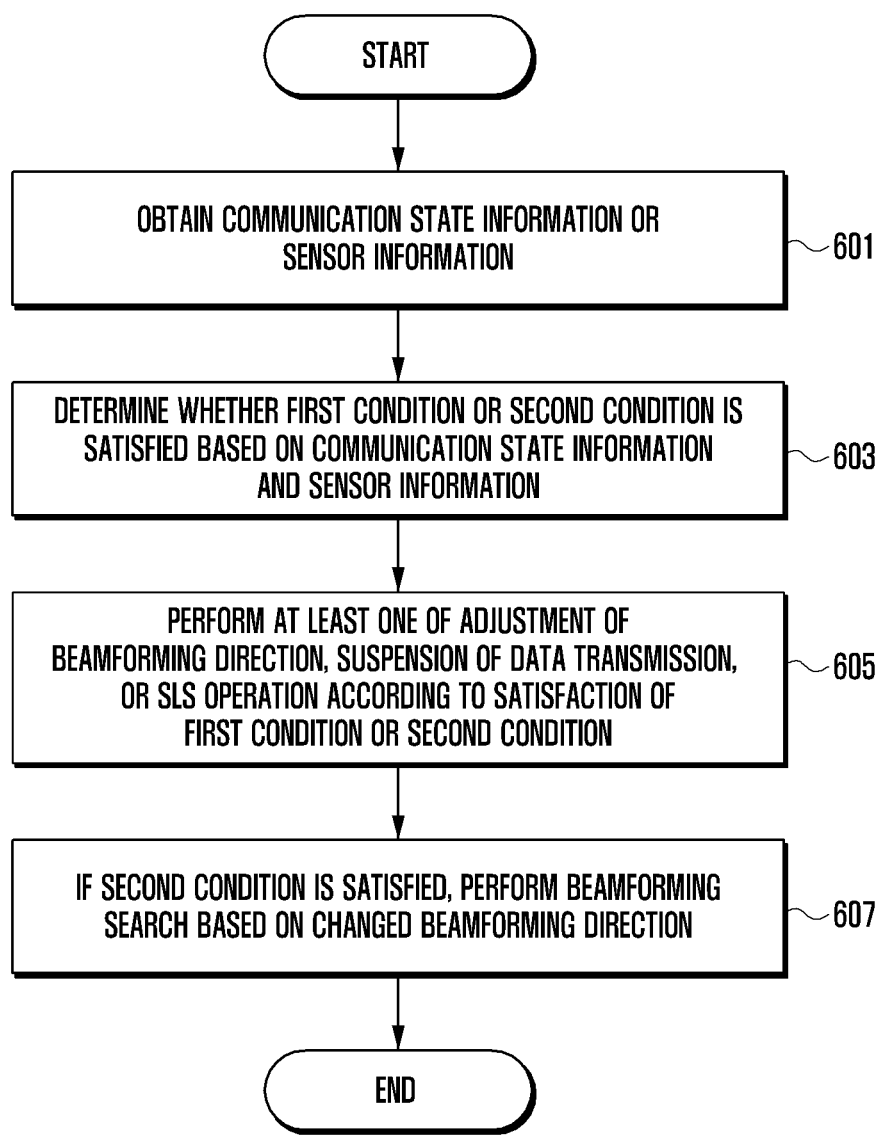
FIG. 6 is a flowchart of a method for operating beamforming based on communication state information and sensor information according to various embodiments of the disclosure.

FIG. 6 is a flowchart of a method for operating beamforming based on communication state information and sensor information according to various embodiments of the disclosure.

With reference to FIG. 6, in various embodiments, at operation 601, the processor (e.g., processor 510 in FIG. 5) of the electronic device (e.g., electronic device 500 in FIG. 5) may obtain information related to the communication state or sensor information. For example, the processor 510 may obtain communication state information through the wireless communication circuit (e.g., wireless communication circuit 530 in FIG. 5) such as RSSI (received signal strength indicator, an indicator of the received signal strength of wireless communication) and SINR (signal to interference plus noise ratio). The processor 510 may use the gyro sensor included in the sensor unit (e.g., sensor unit 540 in FIG. 5) to obtain information on the position of the electronic device 500 (e.g., X-axis (pitch), Y-axis (roll), and Z-axis (azimuth)). The processor 510 may obtain information about the movement speed of the electronic device by using the accelerometer sensor included in the sensor unit 540.

At operation 603, the processor 510 may determine whether the first condition or the second condition is satisfied based on the obtained communication state information and sensor information. For example, the processor 510 may calculate a communication state value based on the obtained communication state information. The communication state value may be calculated by combining information elements about the link speed, modulation coding scheme (MCS) index, SINR, RSSI, and data rate. The processor 510 may calculate sensor values, such as X-axis, Y-axis and Z-axis values and acceleration values, and obtain information about a change in sensor values on the basis of the obtained sensor information.

In various embodiments, the electronic device 500 may configure at least one communication threshold corresponding to the communication state information and at least one sensor threshold corresponding to the sensor information.

The processor 510 may compare the communication state value with a first communication threshold and a second communication threshold corresponding to the communication state information, and may compare the sensor value with a first sensor threshold and a second sensor threshold corresponding to the sensor information. For example, if the current communication state value is less than the first communication threshold corresponding to the communication state information, or if the current sensor value is greater than the first sensor threshold corresponding to the sensor information, the processor 510 may determine that the first condition is satisfied. For example, if the current communication state value is less than the second communication threshold corresponding to the communication state information, or if the current sensor value is greater than the second sensor threshold corresponding to the sensor information, the processor 510 may determine that the second condition is satisfied. In various embodiments, the first communication threshold corresponding to the communication state information may be greater than the second communication threshold corresponding to the communication state information, and the first sensor threshold corresponding to the sensor information may be less than the second sensor threshold corresponding to the sensor information. In various embodiments, the electronic device 500 may determine whether the first condition or the second condition is satisfied based on the communication state information and the sensor information.

At operation 605, the processor 510 may perform at least one of adjustment of the beamforming direction, suspension of data transmission, or sector level sweep (SLS for, e.g., finding a beamforming direction) according to satisfaction of the first condition or the second condition determined based on the communication state information and the sensor information.

For example, if the first condition is satisfied but the second condition is not satisfied, the processor 510 may adjust the beamforming direction. When the second condition is not satisfied and the first condition is satisfied, although the communication performance of the electronic device is deteriorated, the communication performance can be improved by adjusting the beamforming direction. In one embodiment, the processor 510 may determine that the current beamforming direction does not deviate from the existing transmission and reception range based on the sensor value obtained through the sensor unit 540. The processor 510 may identify the sector corresponding to the existing beamforming direction and may determine that the current beamforming direction belongs to the range of the identified sector. The processor 510 may improve communication performance without interrupting communication by adjusting at least some of the beamforming direction.

For another example, if the second condition is satisfied, the processor 510 may suspend data transmission or perform SLS (e.g., beamforming direction search). With reference to FIG. 4, in a WLAN including IEEE 802.11ad, a transmission opportunity (TXOP) permitting a pair of electronic devices to transmit and receive may be specified. The TXOP time may be a time duration where associated electronic devices can exchange data. In FIG. 4, the electronic device may perform SLS based on the SLS protocol 401 in the BTI 411 and the A-BFT interval 413 of the first interval 420. The electronic device may transmit data in the DTI 417 of the second interval 430. The TXOP time may be included in the DTI 417, and when data transmission is suspended in the DTI 417, the remaining TXOP time may be the remaining time in the DTI 417. In various embodiments, when the beamforming direction is outside the specified range of the determined sector during data transmission (i.e., the second condition is satisfied), the communication performance of the electronic device may be greatly degraded, or the communication connection of the electronic device may be lost. In various embodiments, if the second condition is satisfied, the processor 510 may suspend data transmission and check the remaining TXOP time. If the remaining TXOP time is sufficient to perform the SLS operation, the processor 510 may perform the SLS operation according to the remaining TXOP time. If the remaining TXOP time is not sufficient to perform the SLS operation, the processor 510 may perform the SLS operation in the BTI of the next beacon interval. In one embodiment, when a specified condition occurs (e.g., the second condition is met), the processor 510 may determine whether the SLS operation can be performed during the remaining DTI 471 and may rapidly perform beamforming search by performing the SLS operation based on the determination result.

At operation 607, if the second condition is satisfied, the processor 510 may perform beamforming direction search based on the changed beamforming direction. For example, to perform the SLS operation, the processor 510 may select the beam width or apply a fast beamforming direction search technique on the basis of the sensor information. In various embodiments, the processor 510 may select multi-stage beam widths for each sector. A typical millimeter wave system may use a beamforming technique based on a phased array for beamforming control. In the phased array system, the beam width and the beamforming direction may be adjusted by using a phased vector. The electronic device 500 may store in advance the phased vector value for the beam width and the beamforming direction in the memory (e.g., memory 520 in FIG. 5). For example, when defining the beam width in two stages, the second-stage beam width may be greater than the first-stage beam width. In various embodiments, the processor 510 may determine a section including at least one sector and perform beamforming direction search based on the determined section. The section may be a range of beamforming for the processor 510 to search the beamforming direction. In various embodiments, the section includes at least one sector, and may be formed based on adjacent sectors corresponding to the determined beamforming direction. The number of sectors included in a section may be determined according to user settings.

In various embodiments, the processor 510 may detect a change in the direction of the electronic device 500 while performing beamforming direction search based on a first section. Upon detecting a direction change, the processor 510 may perform beamforming direction search based on a second section being smaller in range than the first section. For example, the first section may correspond to 360 degrees around the electronic device 500, and the second section may correspond to a range close to the beamforming direction changed after a direction change. The second section may have a smaller range than the first section, and the smaller range may mean that the number of sectors included in the corresponding section is smaller. For example, if the range of the first section is larger than the range of the second section, this may mean that the number of sectors in the first section is larger than the number of sectors in the second section.

In addition, the processor 510 may store a phased vector, in the memory 520, used to generate a first-stage beam width and a second-stage beam width for each sector. For example, the processor 510 may measure sensor values for the X-axis (pitch), Y-axis (roll), and Z-axis (azimuth). The processor 510 may identify the beamforming direction based on a change amount in the measured sensor values. The processor 510 may measure the angular velocities $X_i$, $Y_i$, and $Z_i$ with respect to the X-axis (pitch), Y-axis (roll), and Z-axis (azimuth) for a unit time T. For example, when using angular velocity values measured n times, the shifted angle values $X_\theta$, $Y_\theta$, and $Z_\theta$ corresponding to the X-axis, Y-axis, and Z-axis may be calculated according to the following equation.

$$x_\theta = \Sigma_{i=0}^{n} X_i \times T_i$$

$$y_\theta = \Sigma_{i=0}^{n} Y_i \times T_i$$

$$z_\theta = \Sigma_{i=0}^{n} Z_i \times T_i \qquad \text{Equation 1}$$

In Equation 1, if the angular velocities obtained during a unit time T with respect to the X, Y, and Z axes of the electronic device 500 are $X_i$, $Y_i$, and $Z_i$, respectively, it is possible to calculate $X_\theta$, $Y_\theta$ and $Z_\theta$ by using the angular velocity values measured n times. In Equation 1, n may be an integer.

For example, when the position and direction of the electronic device 500 are changed, the beamforming direction may be changed by $X_\theta$, $Y_\theta$, and $Z_\theta$ values. The changed beamforming direction may be calculated by subtracting $X_\theta$, $Y_\theta$ and $Z_\theta$ values from the sum of angular velocity measurements corresponding to the existing beamforming direction. As an error may occur at the measured angular velocity, the electronic device 500 may use sectors around the estimated beamforming direction as a group of candidate sectors for correcting the error. In various embodiments, when the beamforming direction is determined, the electronic device 500 may resume data transmission and reception according to the determined beamforming direction.

In various embodiments, the electronic device 500 may search for the beamforming direction based on a first section and determine a first beamforming direction. The first section may include all ranges for searching the beamforming direction with respect to the electronic device 500. In various embodiments, the electronic device 500 may obtain communication state information and sensor information and detect a change in the direction thereof based on the obtained communication state information and sensor information. In various embodiments, the electronic device 500 may determine a second beamforming direction corresponding to a second section based on the detected direction change. The electronic device 500 may estimate the changed direction and search for the second beamforming direction based on the second section being smaller in range than the first section. The second section may include one or more adjacent sectors with respect to the changed direction. In various embodiments, as the electronic device 500 searches for the beamforming direction based on the second section being smaller in range than the first section, it may find the changed beamforming direction more rapidly.

Figure 7A:
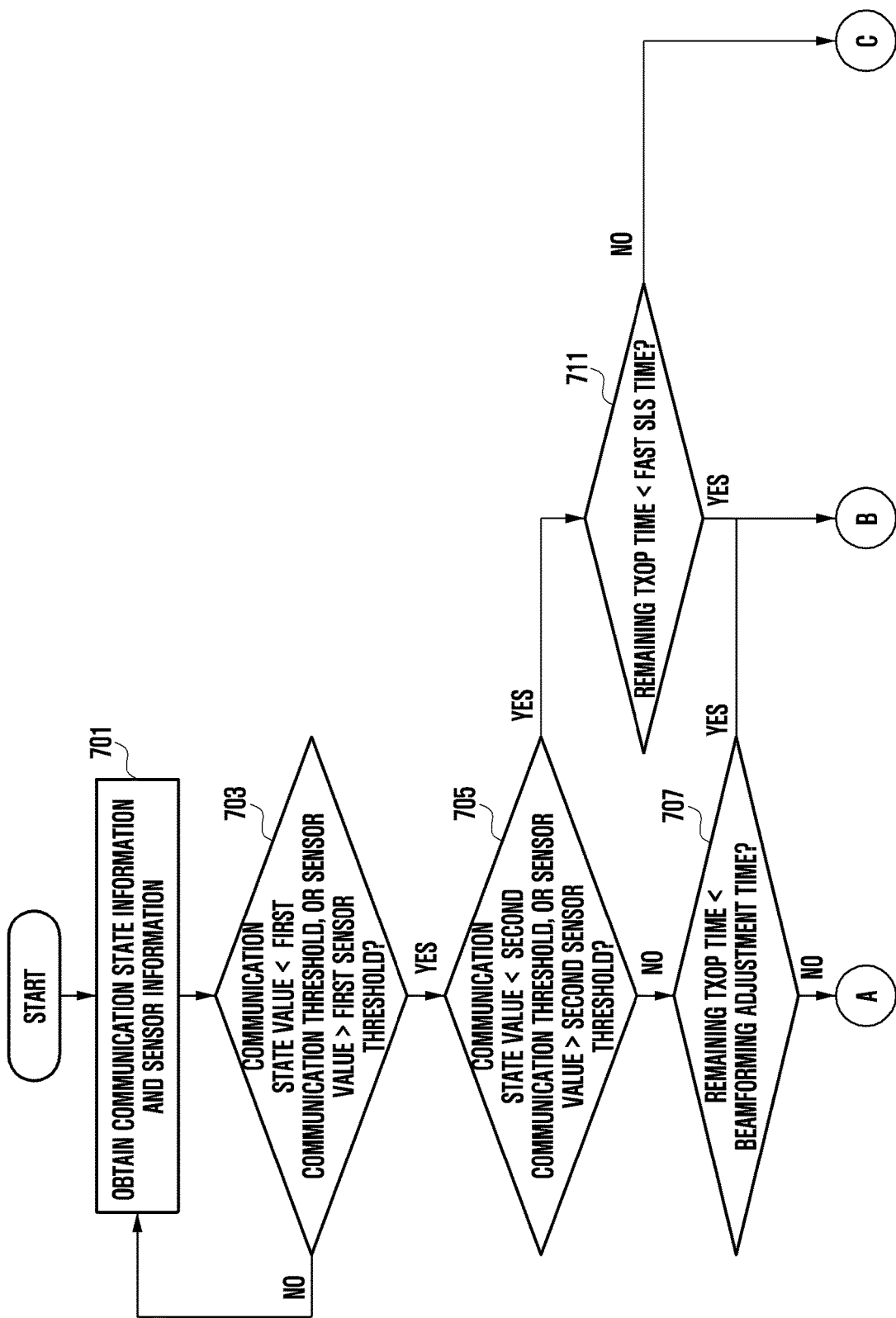
FIGS. 7A and 7B are a detailed flowchart of the method for operating beamforming based on communication state information and sensor information according to various embodiments of the disclosure.
Figure 7B:
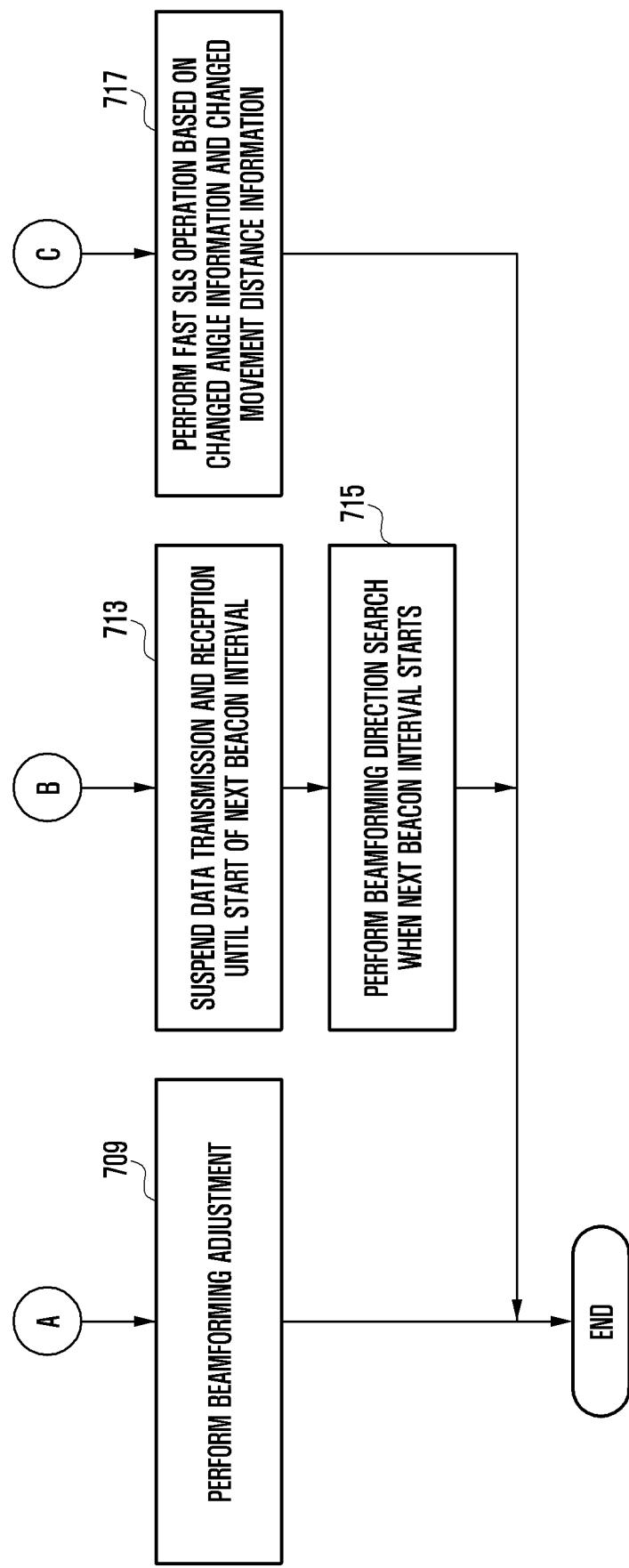

FIGS. 7A and 7B are a detailed flowchart of the method for operating beamforming based on communication state information and sensor information according to various embodiments of the disclosure.

With reference to FIG. 7A, at operation 701, the processor (e.g., processor 510 in FIG. 5) of the electronic device (e.g., electronic device 500 in FIG. 5) may obtain communication state information and sensor information. In one embodiment, the processor 510 may obtain communication state information through the wireless communication circuit (e.g., wireless communication circuit 530 in FIG. 5) and obtain sensor information through the sensor unit (e.g., sensor unit 540 in FIG. 5). The communication state information is used to check the communication performance and may include information about, for example, link speed, MCS index, RSSI, SINR, data rate, or CSI. The sensor information is used to monitor a change in the position of the electronic device 500 and may include information about, for example, a change amount of the angle or the position of the electronic device 500. In various embodiments, the electronic device 500 may set a threshold corresponding to the change amount of the angle and the position and obtain sensor information when the threshold is exceeded.

At operation 703, the processor 510 may compare the communication state value calculated based on the obtained communication state information with the first communication threshold corresponding to the communication state information. The processor 510 may compare the sensor value corresponding to the obtained sensor information with the first sensor threshold corresponding to the sensor information. The processor 510 may determine whether the calculated communication state value is less than the first communication threshold or the calculated sensor value is greater than the first sensor threshold. For example, if the communication state value is less than the first communication threshold, this may mean that the communication performance is deteriorated within a range where beamforming can be adjusted. If the sensor value is greater than the first sensor threshold, this may mean that the electronic device 500 is moved within a range where beamforming can be adjusted.

If the communication state value is less than the first communication threshold or the sensor value is greater than the first sensor threshold, at operation 705, the processor 510 may determine whether the communication state value is less than the second communication threshold or the sensor value is greater than the second sensor threshold. For example, if the communication state value is less than the second communication threshold, this may mean that the communication performance is degraded to a level where beamforming cannot be adjusted. If the sensor value is greater than the second sensor threshold, this may mean that the electronic device is moved to a range where beamforming cannot be adjusted. Upon determining at operation 703 that the communication state value is not less than the first communication threshold and the sensor value is not greater than the first sensor threshold, the procedure may return to operation 701.

If the communication state value is not less than the second communication threshold and the sensor value is not greater than the second sensor threshold at operation 705, at operation 707, the processor 510 may compare the remaining TXOP time with a preset time for beamforming adjustment (beam refinement training). In a typical WLAN, the time required to transmit data once can be determined. Beamforming adjustment may be performed based on a BRP packet included in the data, and the beamforming adjustment time may indicate a time duration for transmitting and receiving data. With reference to FIG. 4, when data transmission is suspended in the DTI period 417, the remaining TXOP time may refer to the remaining time in the DTI period 417 except for the time spent in data transmission.

If the remaining TXOP time is greater than the beamforming adjustment time, at operation 709 of FIG. 7B, the processor 510 may perform beamforming adjustment. For example, beamforming adjustment may be performed by adjusting at least some of the beamforming direction based on the BRP packet included in the data. The processor 510 may identify a sector determined according to the beamforming direction before adjustment and adjust the beamforming direction based on the range of the identified sector.

If the communication state value is less than the second communication threshold or the sensor value is greater than the second sensor threshold at operation 705, at operation 711, the processor 510 may compare the remaining TXOP time with a fast SLS time. For example, the fast SLS time may be a time required to quickly perform an SLS operation. The fast SLS operation may include predicting the changed beamforming direction based on communication state information and sensor information, and performing the SLS operation based on the predicted beamforming direction. In one embodiment, the electronic device 500 may adjust the beam width or estimate a sector based on the changed direction and position of the electronic device 500. For example, the electronic device 500 may increase the beam width with respect to the sector over which data is transmitted in response to a change in the direction and position of the electronic device 500. When the beam width is increased, the number of sectors to be searched can be reduced, reducing the time required to find the beamforming direction. To determine the sector for beamforming direction search, the electronic device 500 may identify the sector ID and perform beamforming direction search preferentially based on the sectors adjacent to the identified sector. The electronic device 500 may reduce the SLS time by reducing the number of sectors to be searched for the beamforming direction. As the fast SLS operation is to perform the SLS operation based on a predicted beamforming direction, the fast SLS time may be shorter than the time required for a normal SLS operation. The processor 510 may determine whether the remaining TXOP time is sufficient to perform a fast SLS operation at operation 711.

If the remaining TXOP time is less than the fast SLS time at operation 711, at operation 713, the processor 510 may suspend data transmission and reception until the start of the next beacon interval.

After suspending data transmission and reception, at operation 715, the processor 510 may perform beamforming direction search when the next beacon interval starts. For example, the processor 510 may perform beamforming direction search corresponding to the SLS operation using the SLS protocol. When determining the beamforming direction through beamforming direction search, the processor 510 may resume the suspended data transmission and reception.

In various embodiments, to perform beamforming direction search at operation 715, the processor 510 may identify the changed direction of the electronic device 500 and may find the beamforming direction based on the identified direction of the electronic device 500. For example, the processor 510 may identify the first beamforming direction based on the first section before the direction of the electronic device 500 is changed. The processor 510 may predict the changed direction of the electronic device 500 and find a second beamforming direction based on the second section with respect to the predicted direction of the electronic device 500. The first section and the second section correspond to a range for beamforming direction search, and the second section may be smaller in range than the first section. The second section may include at least one sector adjacent to the predicted direction of the electronic device 500. As the processor 510 performs second beamforming direction search based on the second section being smaller in range than the first section, it may find the second beamforming direction more rapidly and resume the suspended data transmission and reception.

If the remaining TXOP time is greater than the fast SLS time at operation 711, at operation 717, the processor 510 may perform a fast SLS operation based on the changed angle information and the changed movement distance information of the electronic device 500. The processor 510 may sufficiently perform a fast SLS operation for the remaining TXOP time. For example, the processor 510 may identify a sector corresponding to the current beamforming direction and perform a fast SLS operation based on the identified sector.

In various embodiments, the processor 510 may identify a change in the direction of the electronic device 500 based on the changed angle information and the changed movement distance information. The processor 510 may increase the beam width or predict the beamforming direction based on the changed direction of the electronic device 500. The processor 510 may perform beamforming direction search on the basis of the increased beam width and the predicted beamforming direction, minimizing the time required for beamforming direction search. The processor 510 may identify adjacent sectors with respect to the beamforming direction before the change, and predict the beamforming direction based on the identified sectors. The processor 510 may find the beamforming direction based on the identified sectors, and may maintain data transmission and reception according to the found beamforming direction.

In various embodiments, the electronic device 500 may obtain communication state information and sensor information, detect a change in the direction and position of the electronic device 500 based on the obtained information, and adjust beamforming or perform beamforming direction search. When the position of the electronic device 500 is changed so that it is difficult to adjust beamforming, the electronic device 500 may compare the TXOP time and the fast SLS time. If the TXOP time is sufficient to perform a fast SLS operation, the electronic device 500 may perform a fast SLS operation based on the changed direction and position thereof. If the TXOP time is not sufficient, the electronic device 500 may perform a SLS operation again in the next beacon interval. In one embodiment, the electronic device 500 may perform a fast SLS operation or a normal SLS operation based on the changed direction and position of the electronic device 500 in the next beacon interval.

FIGS. 8A to 8D depict a process of obtaining sensor information according to various embodiments of the disclosure.

Figure 8A:
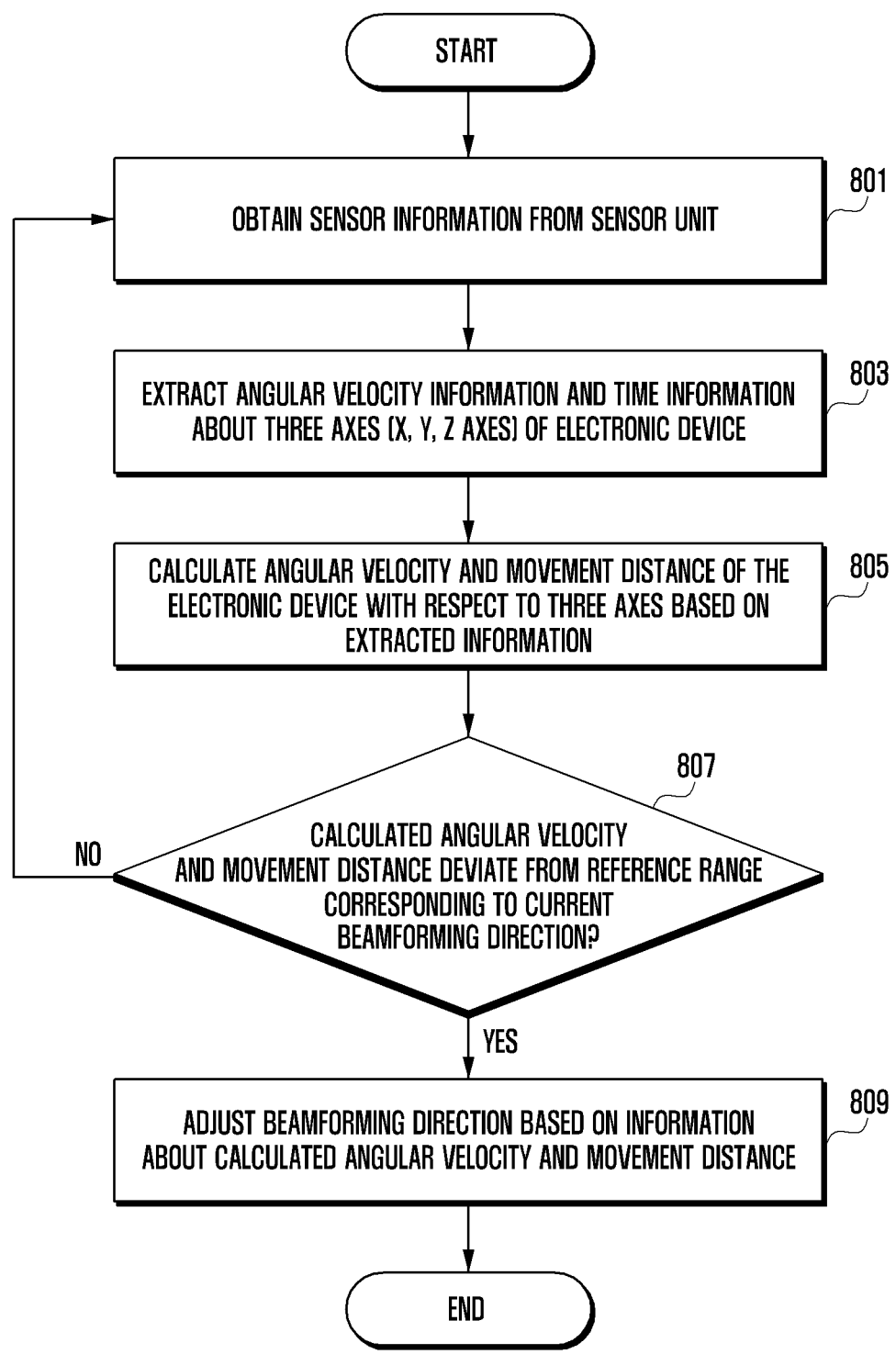
FIGS. 8A to 8D depict a process of obtaining sensor information according to various embodiments of the disclosure.

FIG. 8A is a flowchart illustrating a process of utilizing obtained sensor information. With reference to FIG. 8A, at operation 801, the processor (e.g., processor 510 in FIG. 5) may obtain sensor information from the sensor unit (e.g., sensor unit 540 in FIG. 5 including the gyro sensor 541, accelerometer sensor 543, and geomagnetic sensor 545). For example, the processor 510 may obtain information about the X-axis (pitch), the Y-axis (roll), and the Z-axis (azimuth) through the gyro sensor 541, and obtain movement speed information, grip information, or proximity information of the electronic device (e.g., electronic device 500 in FIG. 5) through the accelerometer sensor 543. The processor 510 may also obtain information about the angle and movement range of the electronic device 500 based on the sensor information.

At operation 803, the processor 510 may extract angular velocity information and time information with respect to the three axes around the electronic device 500. At operation 805, the processor 510 may calculate the angular velocity and the movement distance of the electronic device 500 with respect to the three axes. At operation 807, the processor 510 may determine whether the calculated angular velocity and the movement distance deviate from a reference range corresponding to the current beamforming direction. If not deviated from the reference range, the procedure returns to operation 801. If deviated from the reference range, at operation 809, the processor 510 may adjust the beamforming direction based on the information about the calculated angular velocity and movement distance.

Figure 8B:
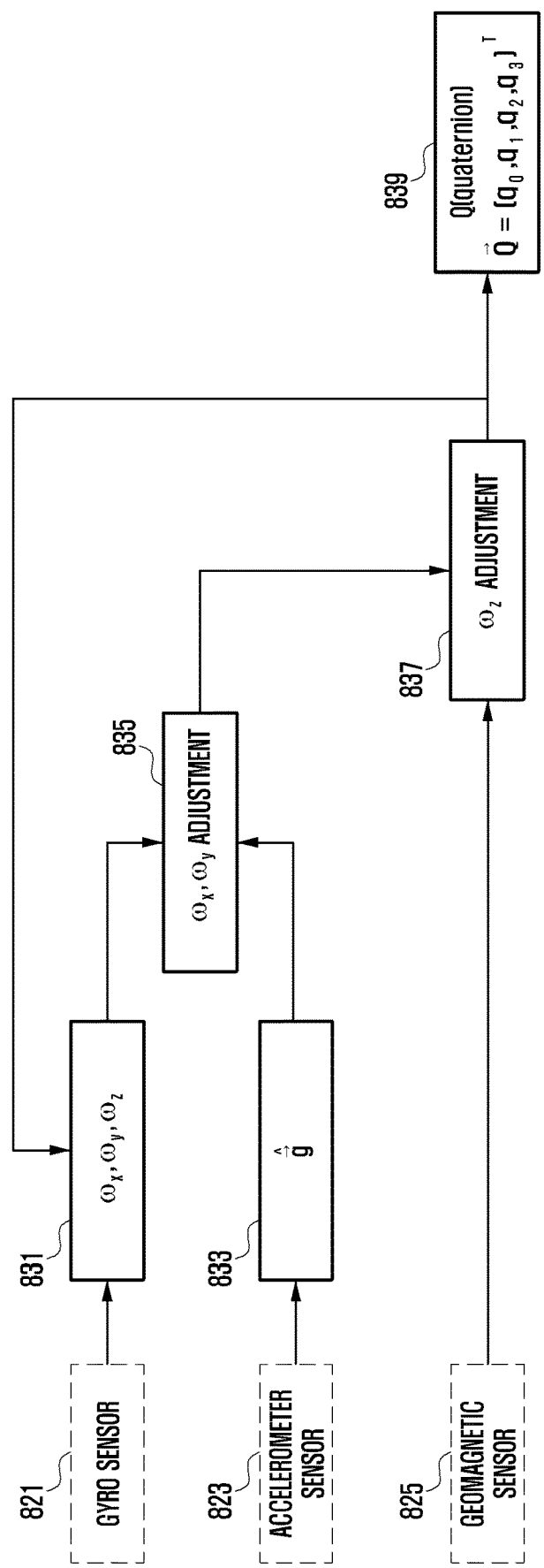

FIG. 8B illustrates a process of extracting angular velocities of the electronic device 500 about the three axes (e.g., X, Y, and Z axes). In various embodiments, quaternions can be used to calculate the angular velocities about the three axes. Calculations based on quaternions are well known and will not be described herein. With reference to FIG. 8B, the sensor unit of the electronic device 500 may include a gyro sensor 821, an accelerometer sensor 823, and a geomagnetic sensor 825. At operation 831, the processor 510 may obtain an angular velocity Wx about the X axis, an angular velocity Wy about the Y axis, and an angular velocity Wz about the Z axis by use of the gyro sensor 821. At operation 833, the processor 510 may obtain a gravitational acceleration value of the body coordinate system by use of the accelerometer sensor 823. At operation 835, the processor 510 may correct the angular velocity Wx about the X axis and the angular velocity Wy about the Y axis by using the difference between the gravitational acceleration of the body coordinate system and the actual gravitational acceleration. At operation 837, the processor 510 may correct the angular velocity Wz about the Z axis by using the information obtained from the geomagnetic sensor 825. Correction for the angular velocity about the X axis and the angular velocity about the Y axis is performed first, and correction for the angular velocity about the Z axis is performed next, but the disclosure is not limited to this order of correction. At operation 801, the processor 510 may perform computations using quaternions (e.g., measured values representing the attitude of the electronic device) on the basis of the corrected angular velocities about the three axes.

Figure 8C:
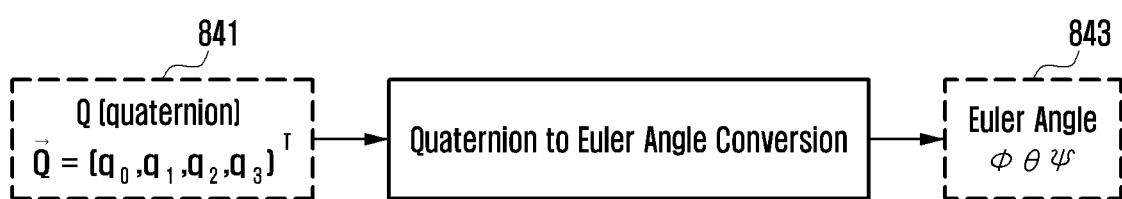

FIG. 8C illustrates a process of converting quaternions into Euler angles of three axes. The process of converting quaternions to Euler angles corresponding to three axes of the electronic device 500 is well known and will not be described herein. The processor 510 of the electronic device 500 may determine in which direction the electronic device 500 moves based on the changed angle. The processor 510 of the electronic device 500 may determine the direction in which the electronic device 500 is moved based on the changed angle. For example, the processor 510 may measure the acceleration f at the time when the movement of the electronic device 500 is recognized by using the magnitude of the acceleration vector. At this time, the processor 510 may measure the gravitational acceleration g of the body coordinate system with respect to the electronic device 500. The processor 510 may calculate the acceleration h projected on the horizontal plane of the body coordinate system according to the following equation. (g*g of the denominator is applied to make the magnitude of the converted acceleration constant.)

$$h = \frac{f - (f \cdot g)g}{g \cdot g} \qquad \text{Equation 2}$$

According to equation 2, the acceleration h projected on the horizontal plane of the body coordinate system may be calculated using the acceleration f and gravitational acceleration g of the electronic device 500 at the time when the movement of the electronic device 500 is recognized.

The gravitational acceleration g in the body coordinate system in Equation 2 may be obtained by applying a low pass filter to the acceleration value measured by the electronic device 500. As the gravitational acceleration is a vector value, the processor 510 may determine the direction in which the electronic device 500 moves based on the acceleration h. The distance traveled by the electronic device 500 may be obtained by integrating the acceleration h twice with respect to the movement time. As the movement distance may contain an error according to a change in time, a Kalman filter may be used to reduce the error.

Figure 8D:
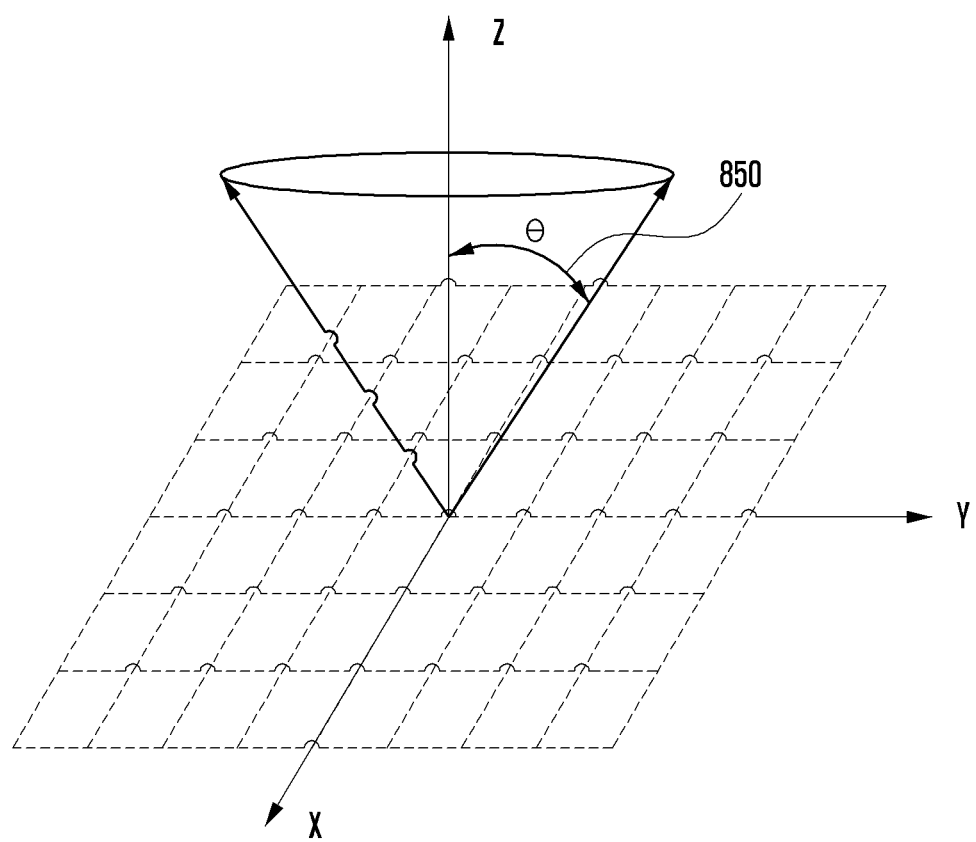

FIG. 8D illustrates a process of determining whether the electronic device is out of the reference range. In various embodiments, it is possible to specify a first reference range in which the beamforming direction is adjustable and a second reference range in which the beamforming direction is not adjustable. In various embodiments, if the electronic device 500 is out of the first reference range, it may maintain data transmission and reception by adjusting the beamforming direction. If the electronic device 500 is out of the second reference range, it may suspend data transmission and reception and perform beamforming direction search. The first reference range and the second reference range may be determined through experiments in the manufacturing process of the electronic device 500. The first reference range and the second reference range may be determined in association with a range corresponding to each sector.

FIG. 8D illustrates the width and direction of the beam when beamforming is performed with respect to the Z-axis direction. With reference to FIG. 8D, the electronic device 500 may perform beamforming according to the determined sector. For example, the electronic device 500 may perform a beamforming operation in the Z-axis direction by using a beam width of an angle θ (850). The beam width is θ (850), and θ (850) may indicate a range in which data communication can be maintained even when the direction of the electronic device 500 is changed. Here, θ (850) may correspond to the second reference range described above. When the electronic device 500 is moved out of θ (850), the processor 510 may suspend data communication and perform beamforming direction search.

Figure 9A:
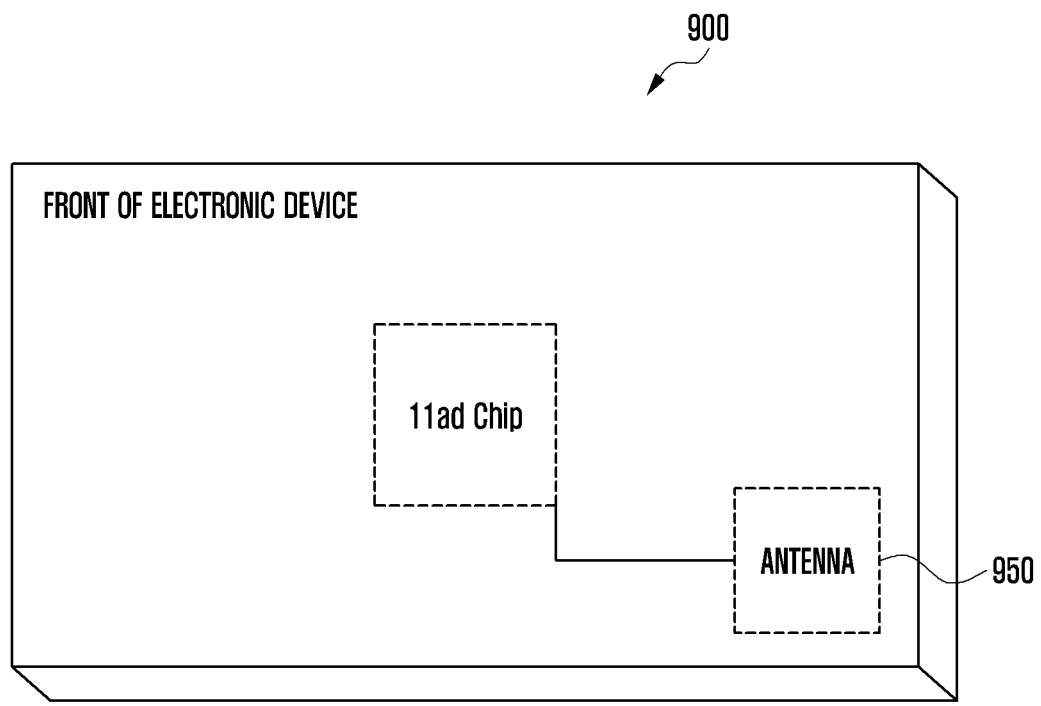
FIGS. 9A to 9C illustrate antenna arrangements according to various embodiments of the disclosure.
Figure 9B:
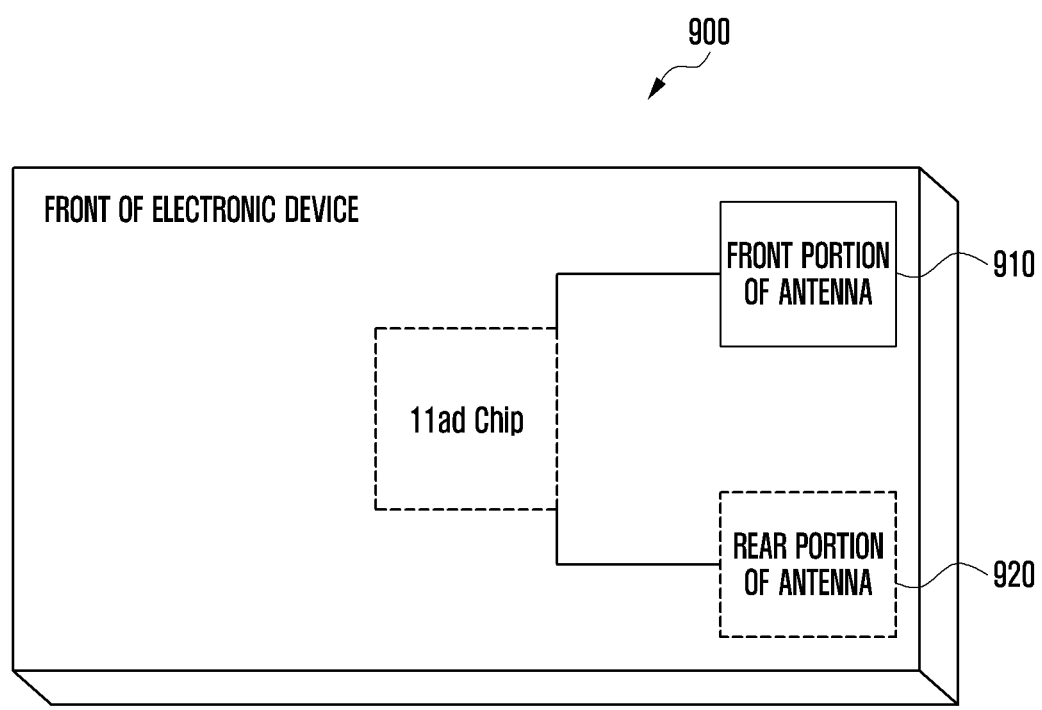
Figure 9C:
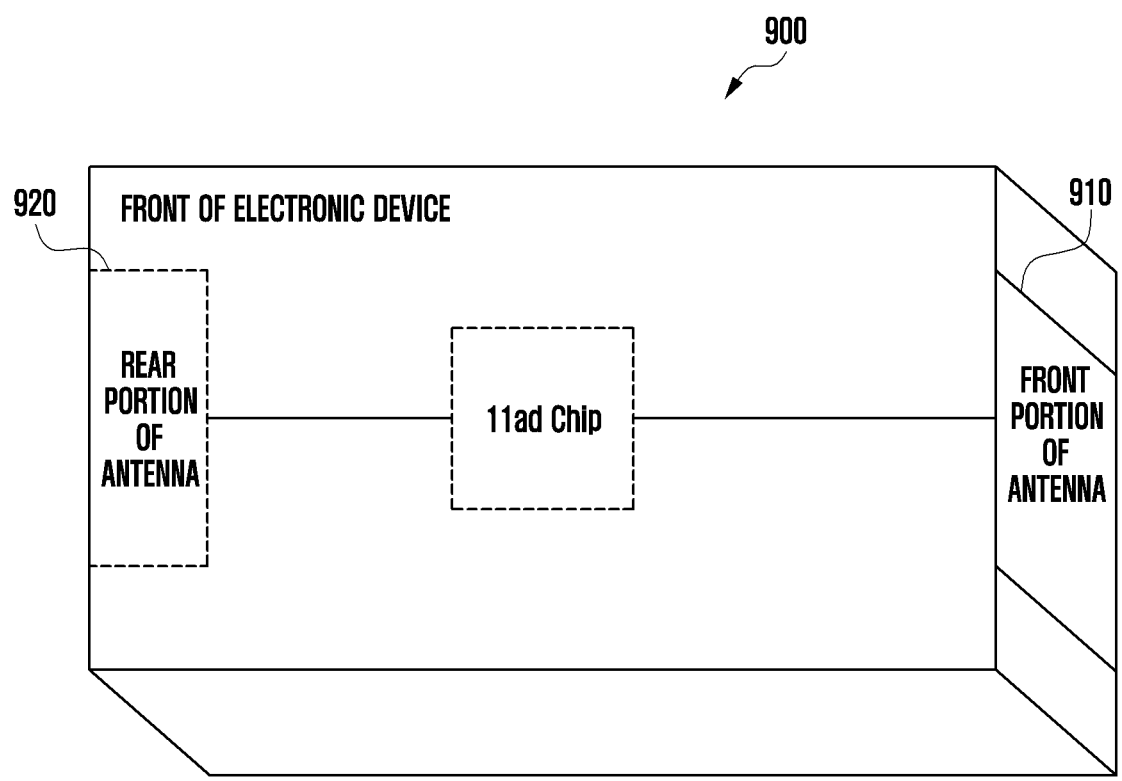

FIGS. 9A to 9C illustrate antenna arrangements according to various embodiments of the disclosure.

The electronic device 900 (e.g., electronic device 500 in FIG. 5) may perform data communication through the antenna 950 (e.g., antenna 531 in FIG. 5). The antenna 950 may be variously arranged inside the electronic device. The antenna 950 of the electronic device 900 may be an array antenna, and at least one antenna element may be mounted at least partially inside the electronic device 900. With reference to FIG. 9A, the antenna 950 may be disposed on the rear surface of the electronic device 900 facing away from the display. In one embodiment, when the antenna 950 is mounted on the rear surface of the electronic device 900, the antenna 950 may be disposed on the PCB of the electronic device 900 or be attached to the rear cover of the electronic device 900. With reference to FIG. 9B, the antenna of the electronic device 900 may be divided into two portions (e.g., front portion 910 and rear portion 920), which may be disposed on the front surface and the rear surface of the electronic device 900, respectively. For example, the front portion 910 of the antenna may be disposed on the front surface of the electronic device 900, and the rear portion 920 of the antenna may be disposed on the rear surface of the electronic device 900. With reference to FIG. 9C, the antenna 950 of the electronic device 900 may be disposed on the side surface of the electronic device 900. For example, the front portion 910 of the antenna may be disposed on one side of the electronic device 900, and the rear portion 920 of the antenna may be disposed on another side of the electronic device 900.

Figure 10:
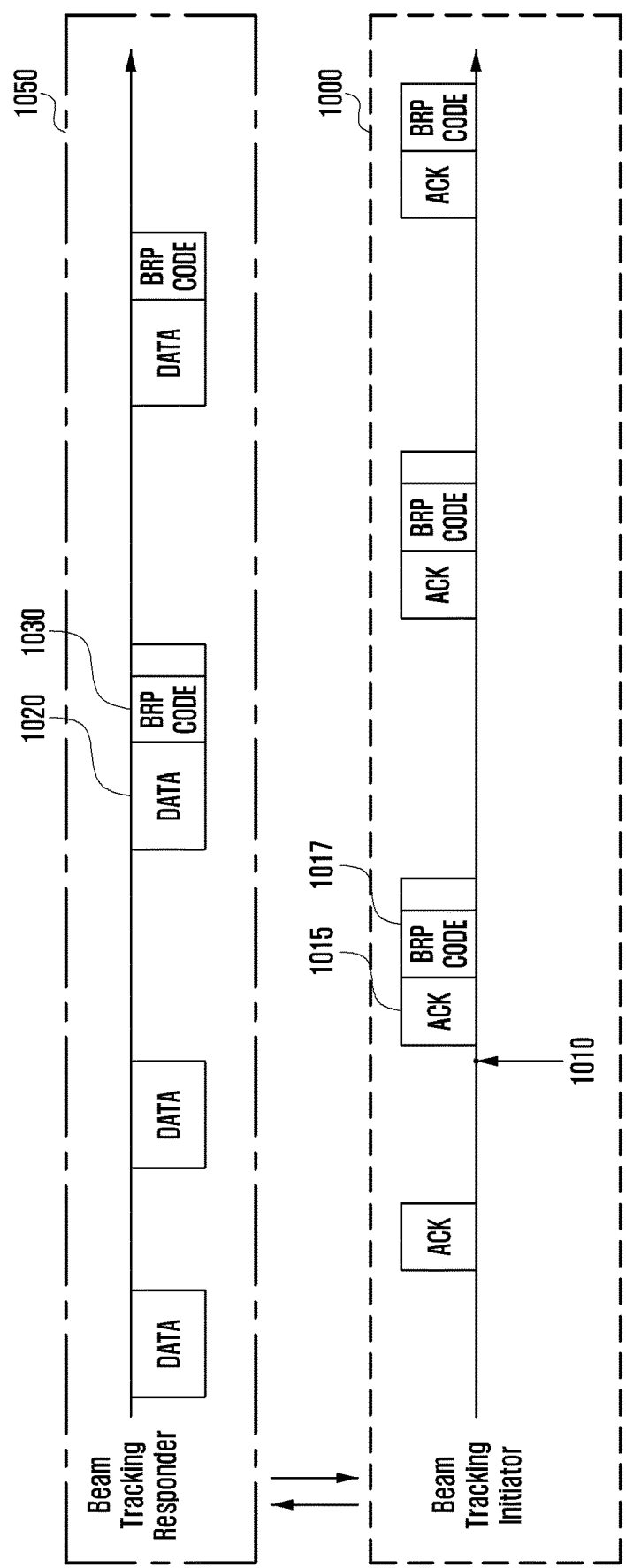
FIG. 10 depicts a process of adjusting the beamforming direction according to various embodiments of the disclosure.

FIG. 10 depicts a process of adjusting the beamforming direction according to various embodiments of the disclosure.

With reference to FIG. 10, the processor (e.g., processor 510 in FIG. 5) of the electronic device 1000 (e.g., electronic device 500 in FIG. 5) may finely adjust the beamforming direction to increase the communication performance while maintaining the existing sector. The processor 510 of the electronic device 1000 may determine whether to adjust the beamforming direction while transmitting and receiving data through an external electronic device 1050 (e.g., access point (AP)). (In FIG. 6, the electronic device may determine whether the first condition is satisfied.) In FIG. 10, the processor 510 of the electronic device 1000 may detect a change in the beamforming direction while exchanging data with the external electronic device 1050. For example, the processor 510 may determine that the beamforming direction has been changed based on the sensor value and the communication state value of the electronic device 1000. The processor 510 may include a BRP-based code 1017 in the ACK packet 1015 to perform beamforming direction search from the detection time point 1010. In response to the ACK packet 1015, the external electronic device 1050 may transmit a data packet 1020 including a BRP-based code 1030 to the electronic device 1000. The processor 510 of the electronic device 1000 may receive the data packet 1020 including a BRP-based code 1030 from the external electronic device 1050. The processor 510 may adjust the beamforming direction based on the received data packet 1020 and may continue to receive data from the external electronic device 1050 according to the adjusted beamforming direction.

In various embodiments, the electronic device 1000 may finely adjust the beamforming direction by using the BRP-based code 1030 while maintaining data communication with the external electronic device 1050. The electronic device 1000 may adjust the beamforming direction within the range of the existing sector.

Figure 11A:
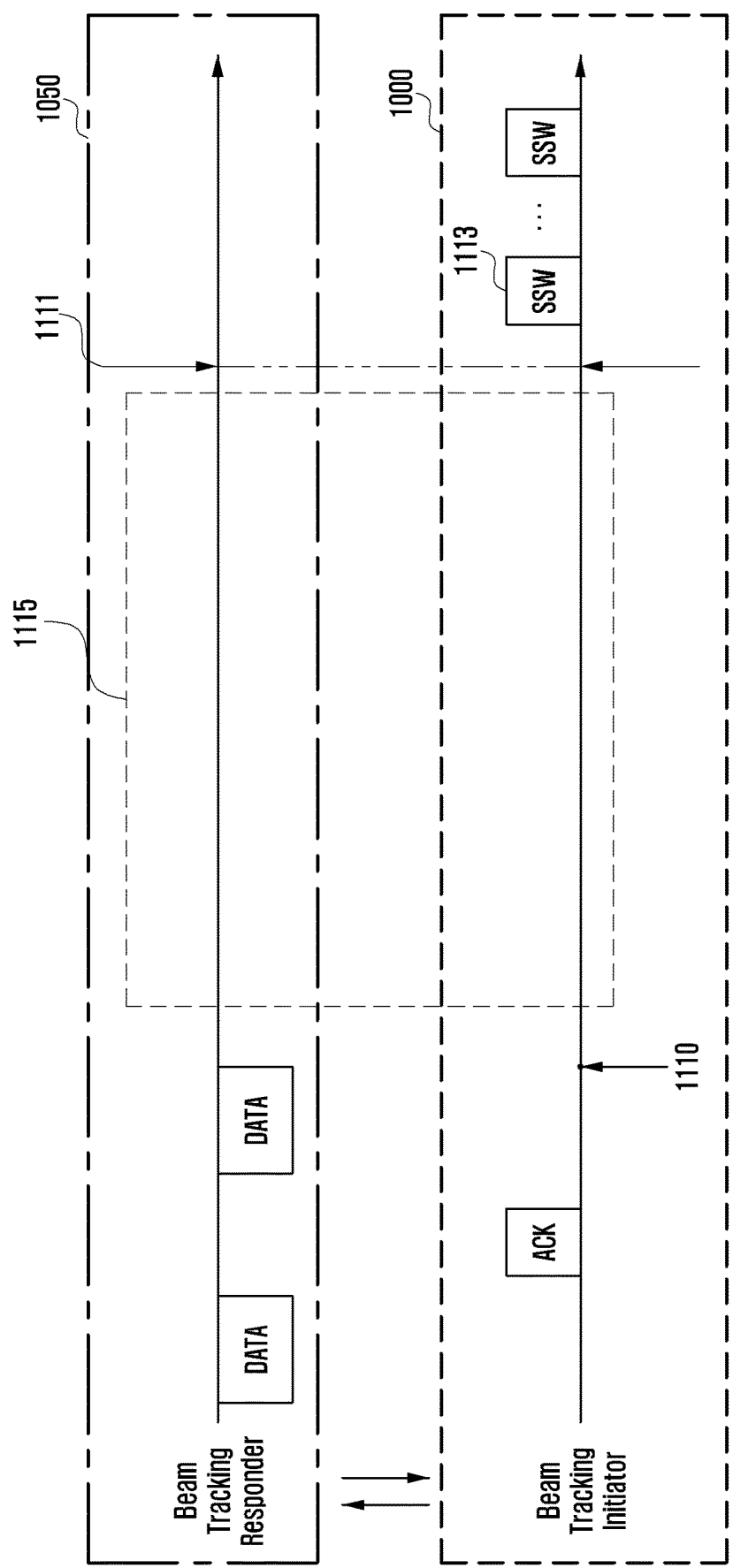
FIGS. 11A and 11B depict a process of finding the beamforming direction when the electronic device is moved out of a sector range according to various embodiments of the disclosure.
Figure 11B:
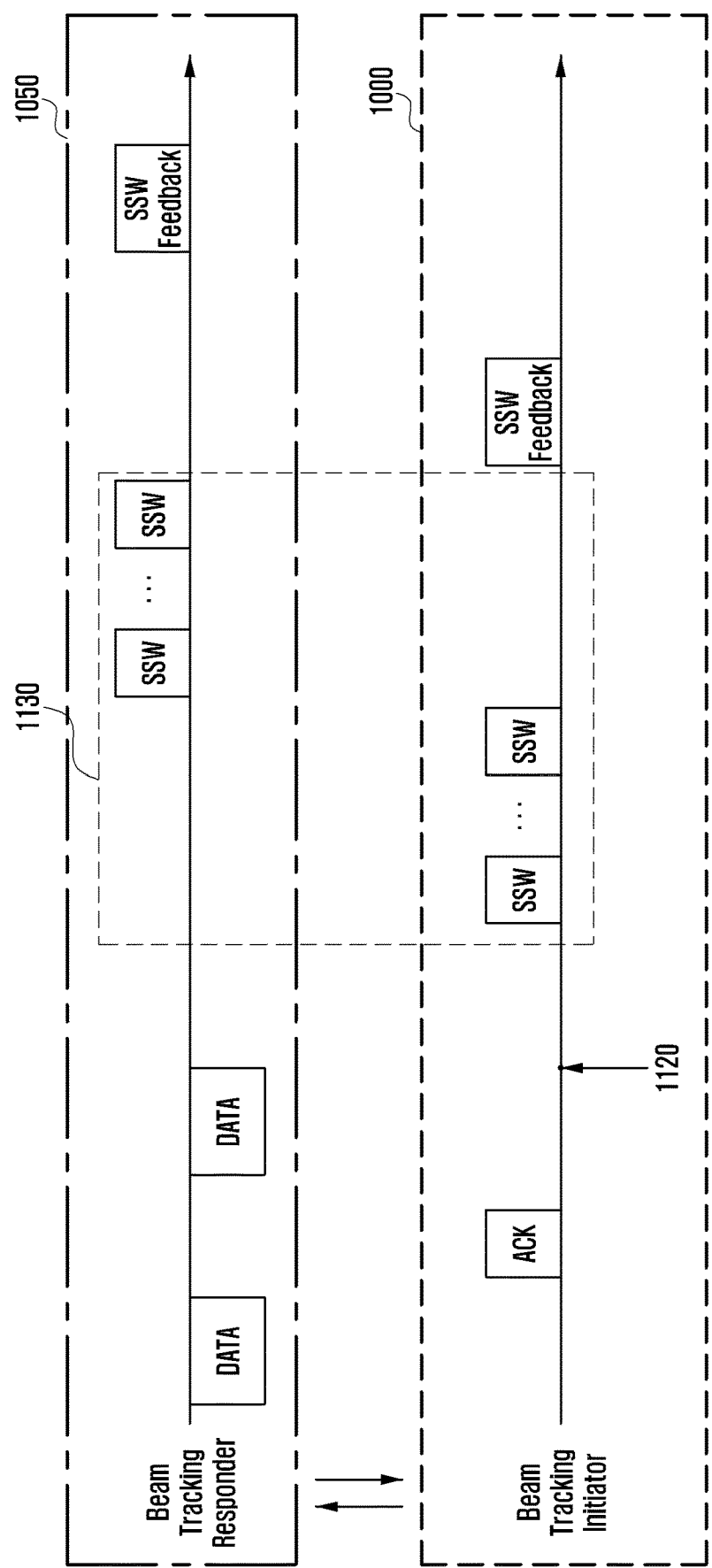

FIGS. 11A and 11B depict a process of finding the beamforming direction when the electronic device is moved out of a sector range according to various embodiments of the disclosure.

FIG. 11A illustrates a situation where data communication is lost while the electronic device 1000 (e.g., electronic device 500 in FIG. 5) receives data from the external electronic device 1050. With reference to FIG. 11A, when data communication with the external electronic device 1050 is lost (1110), the electronic device 1000 may compare the remaining TXOP time 1115 with the SLS time set for beamforming direction search. For example, when the electronic device 1000 is moved out of the range of a sector corresponding to the existing beamforming direction, data communication may be interrupted. When the remaining TXOP time 1115 is less than the SLS time for beamforming direction search, the electronic device 1000 may suspend data transmission and reception. The electronic device 1000 may suspend data transmission and reception for the remaining TXOP time 1115 until the time point 1111 where the next beacon interval starts. In various embodiments, the electronic device 1000 may suspend data transmission and reception for the remaining TXOP time 1115, and perform beamforming direction search (e.g., SSW (sector sweep) 1113) from the time point 1111 where the next beacon interval starts. The electronic device 1000 may determine the beamforming direction based on the SSW operation 1113, and resume data transmission and reception according to the determined beamforming direction.

FIG. 11B illustrates a situation where the electronic device 1000 performs an SLS operation when data communication with the external electronic device 1050 is lost. With reference to FIG. 11B, when data communication with the external electronic device 1050 is lost (1120), the electronic device 1000 may compare the remaining TXOP time with the SLS time set for beamforming direction search. If the remaining TXOP time is greater than the SLS time for beamforming direction search, the electronic device 1000 may perform a SLS operation 1130 based on the remaining TXOP time. For example, the electronic device 1000 may determine the beamforming direction on the basis of the SLS operation 1130 with the external electronic device 1050. When the beamforming direction is determined according to the result of the SLS operation 1130, the electronic device 1000 may resume data communication with the external electronic device 1050 based on the determined beamforming direction.

Figure 12:
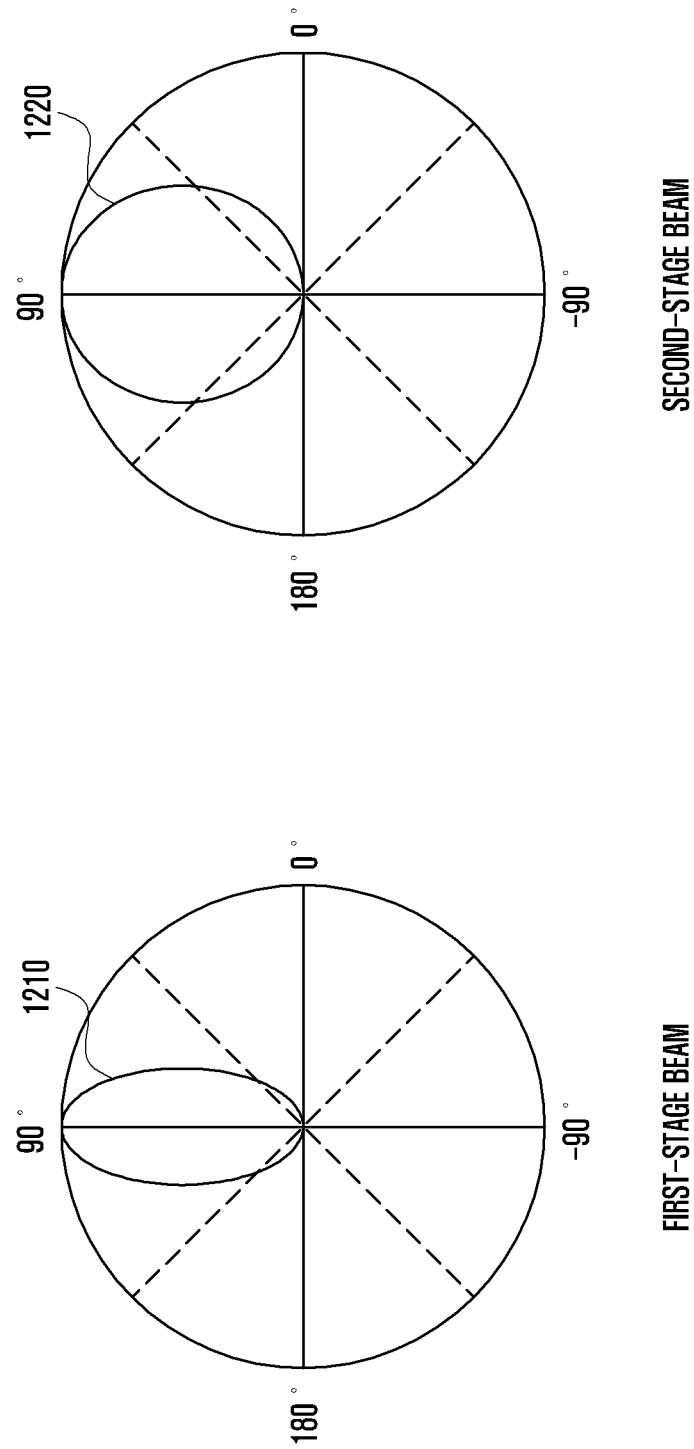
FIG. 12 illustrates adjustment of the width of a beam according to various embodiments of the disclosure.

FIG. 12 illustrates adjustment of the beam width according to various embodiments of the disclosure.

In various embodiments, in the electronic device (e.g., electronic device 500 in FIG. 5), the beam width may be determined, and the search space for finding the beamforming direction may be determined based on the determined beam width. The search space may correspond to a section. In various embodiments, the electronic device 500 may determine a section for finding the beamforming direction and perform beamforming direction search based on the determined section. In various embodiments, if the beam width becomes large, the range to search for the beamforming direction at one time may increase, and the number of beamforming direction searches may be reduced. That is, the time required to find the beamforming direction for the electronic device 500 may be reduced.

With reference to FIG. 12, the electronic device 500 may store information about multi-stage beam widths in the memory by using phased vector values. For example, when defining two-stage beam widths, the width of the second-stage beam 1220 may be greater than that of the first-stage beam 1210. The phased vectors that can be generated for each direction based on the width of the first-stage beam 1210 and the width of the second-stage beam 1220 may be stored in the memory. The number of sectors corresponding to the width of the first-stage beam 1210 may be larger than the number of sectors corresponding to the width of the second-stage beam 1220. In various embodiments, the electronic device 500 may perform a SLS operation based on the width of the first-stage beam 1210 and may perform a fast SLS operation based on the width of the second-stage beam 1220. As the fast SLS operation involves fewer sectors to be searched for the beamforming direction than the normal SLS operation, the beamforming direction search can be performed more rapidly.

Figure 13:
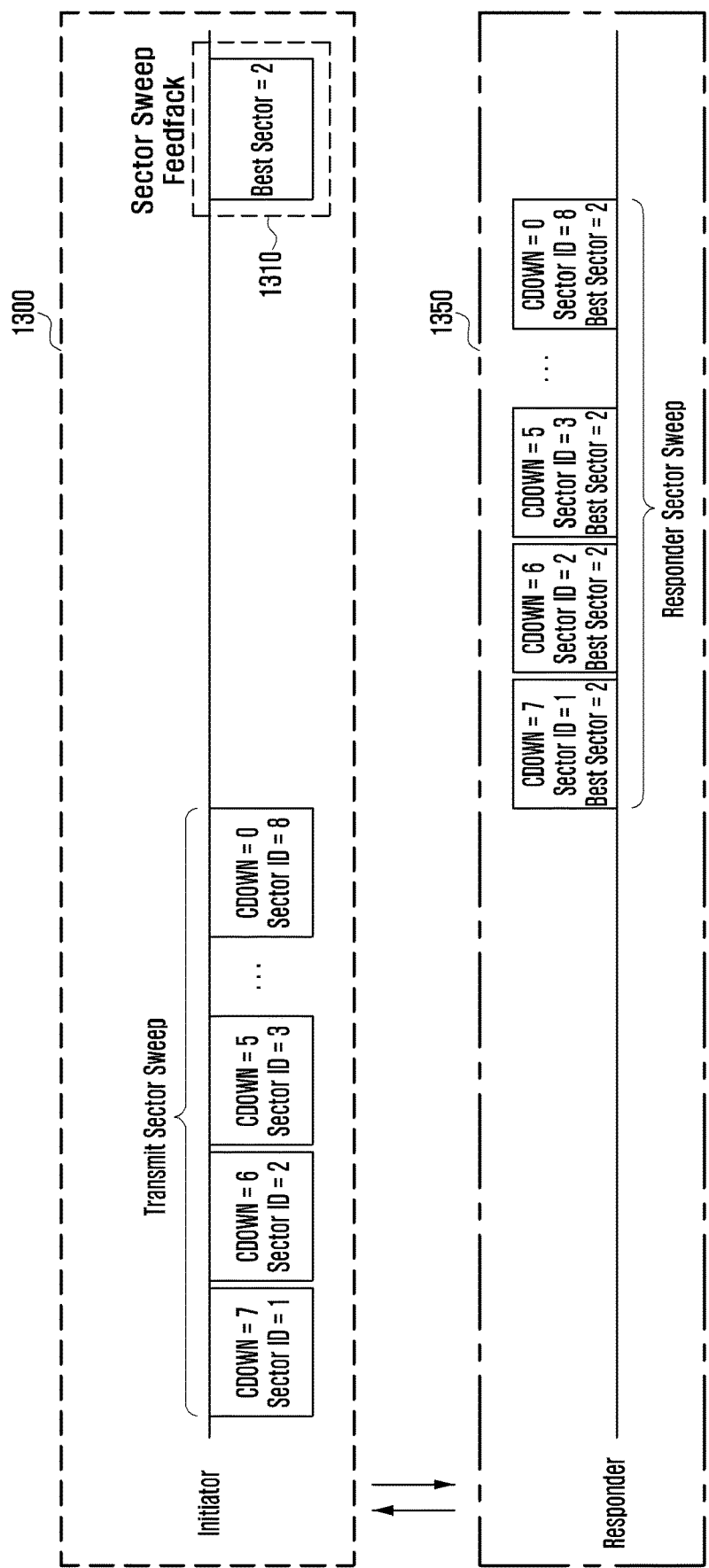
FIG. 13 depicts a process of determining the beamforming direction for an external electronic device based on a first-stage beam width according to various embodiments of the disclosure.

FIG. 13 depicts a process of determining the beamforming direction for a external electronic device based on a first-stage beam width according to various embodiments of the disclosure.

With reference to FIG. 13, based on the width of a first-stage beam (e.g., first-stage beam 1210 in FIG. 12), the processor (e.g., processor 510 in FIG. 5) of the electronic device 1300 (e.g., electronic device 500 in FIG. 5) may determine the number of sectors to be eight. The processor 510 may perform an SLS operation (e.g., transmission of SSW frames for beamforming direction search) with the external electronic device 1350 by use of the eight sectors. For example, the processor 510 of the electronic device 1300 (e.g., initiator in FIG. 13) may transmit SSW frames to the external electronic device 1350 (e.g., responder in FIG. 13) according to the eight sectors. The electronic device 1300 may transmit eight SSW frames corresponding to the eight sectors. The electronic device 1300 may repeatedly perform the SLS operation (e.g., transmission of a SSW frame for beamforming direction search) by the determined number of sectors. The processor 510 may determine a sector 1310 with the highest communication performance (e.g., best sector, sector ID of 2) among the eight sectors (e.g., sector IDs of 1 to 8).

Figure 14:
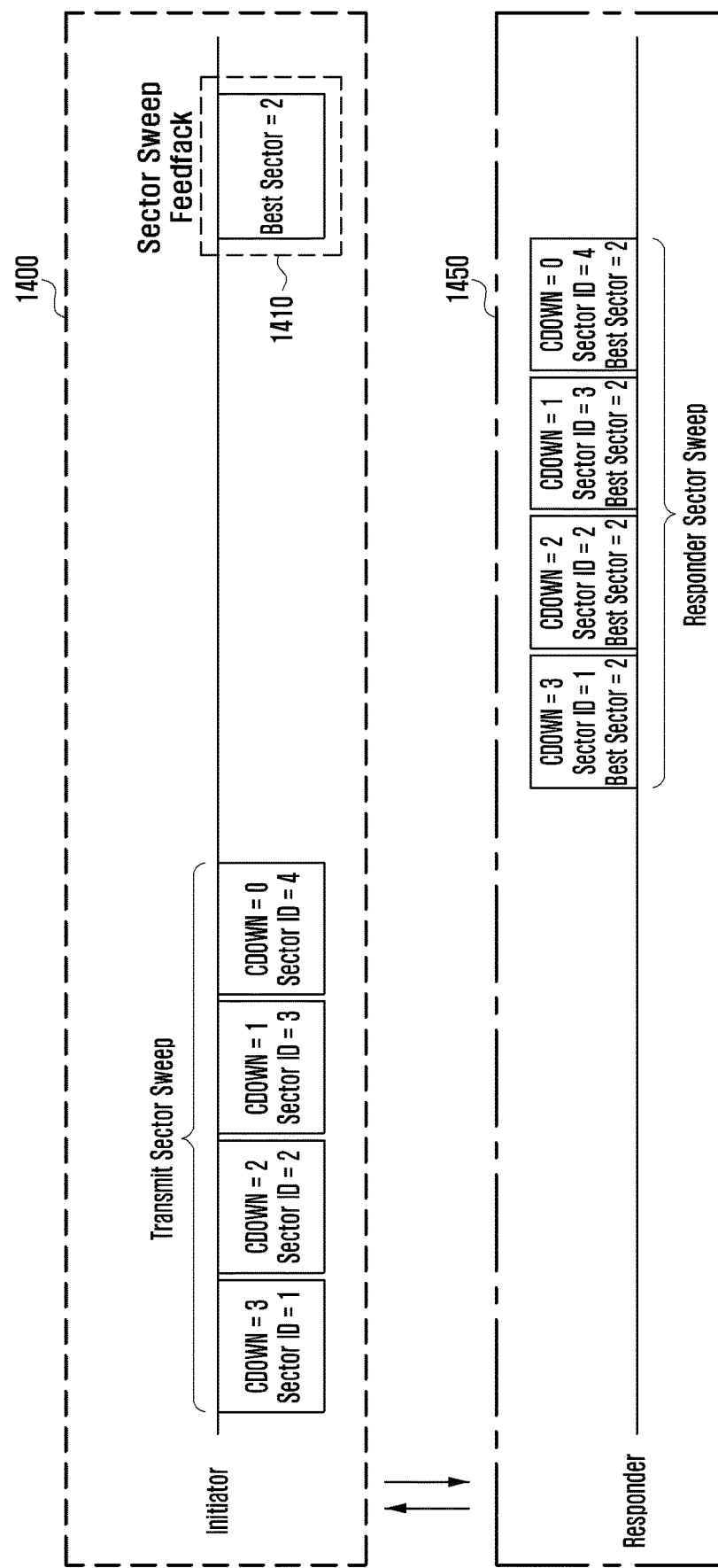
FIG. 14 depicts a process of determining the beamforming direction for an external electronic device based on a second-stage beam width according to various embodiments of the disclosure.

FIG. 14 depicts a process of determining the beamforming direction for an external electronic device based on a second-stage beam width according to various embodiments of the disclosure.

With reference to FIG. 14, based on the width of a second-stage beam (e.g., second-stage beam 1220 in FIG. 12), the processor (e.g., processor 510 in FIG. 5) of the electronic device 1400 (e.g., electronic device 500 in FIG. 5) may determine the number of sectors to be four. The processor 510 may perform an SLS operation with the external electronic device 1450 by use of the four sectors. For example, the processor 510 of the electronic device 1400 (e.g., initiator in FIG. 14) may transmit SSW frames to the external electronic device 1450 (e.g., responder in FIG. 14) according to the four sectors. The electronic device 1400 may transmit four SSW frames corresponding to the four sectors. The electronic device 1400 may repeatedly perform the SLS operation (e.g., transmission of a SSW frame for beamforming direction search) by the determined number of sectors. The processor 510 may determine a sector 1410 with the highest communication performance (e.g., sector ID of 2) among the four sectors (e.g., sector IDs of 1 to 4).

With reference to FIGS. 13 and 14, if the width of the second-stage beam is greater than the width of the first-stage beam, the number of sectors may be reduced. As the width of the second-stage beam of FIG. 14 is twice the width of the first-stage beam of FIG. 13, the number of sectors of the electronic device 1400 in FIG. 14 may be ½ of the number of sectors of the electronic device 1300 in FIG. 13. In various embodiments, the electronic device 500 may determine the number of sectors based on the beam width and perform an SLS operation (e.g., transmission of a SSW frame for beamforming direction search) according to the determined number of sectors. In various embodiments, as the number of SLS operations is reduced by the decreased number of sectors, the electronic device 500 may reduce the time required for beamforming direction search.

Figure 15:
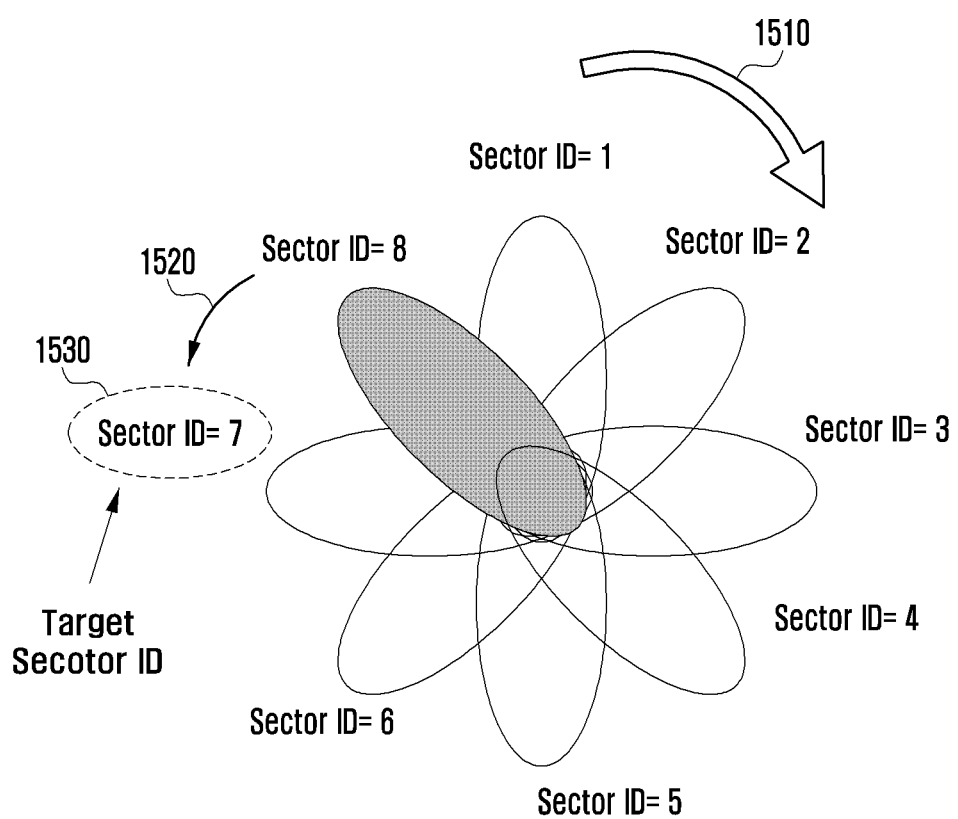
FIG. 15 depicts a process of sector estimation based on changes in the angle corresponding to the beamforming direction according to various embodiments of the disclosure.

FIG. 15 depicts a process of sector estimation based on changes in the angle corresponding to the beamforming direction according to various embodiments of the disclosure.

With reference to FIG. 15, the electronic device (e.g., electronic device 500 in FIG. 5) may determine a sector for each direction with respect to the electronic device 500. The processor (e.g., processor 510 in FIG. 5) of the electronic device 500 may determine the number of sectors based on the beam width and assign sector IDs to the sectors. The electronic device 500 may determine the direction of a sector based on its sector ID.

In various embodiments, the electronic device 500 may obtain sensor information through the sensor unit (e.g., sensor unit 540 in FIG. 5) and detect a change in the direction and position of the electronic device 500 based on the obtained sensor information. The electronic device 500 may predict the beamforming direction based on the changed direction and position of the electronic device 500. For example, the electronic device 500 may identify the sector ID corresponding to the beamforming direction before the direction change, and may predict the sector ID of a region adjacent to the identified sector ID as the changed beamforming direction. The electronic device 500 may assign sector IDs based on the number of sectors and may set the number of sectors corresponding to a region adjacent to a specific sector ID.

In FIG. 15, the electronic device (e.g., electronic device 500 in FIG. 5) may specify eight sectors based on the beam width. The electronic device 500 may assign sector IDs (e.g., 1 to 8) to the individual sectors. The electronic device 500 may detect a change in the direction and position of the electronic device 500 based on the obtained sensor information, and determine a predicted sector ID. Then, the electronic device 500 may search for the beamforming direction based on sectors corresponding to a region adjacent to the determined sector ID. For example, the electronic device 500 may perform data communication with an external electronic device over the sector with a sector ID of 8. While performing data communication over the sector with a sector ID of 8, the electronic device 500 may detect a change in the sensor angle based on sensor information. For example, when the sensor angle is changed in a first direction 1510, the electronic device 500 may predict that the beamforming direction is changed in a second direction 1520. The electronic device 500 may predict the sector 1530 with a sector ID of 7 as the sector changed corresponding to the beamforming direction. In one embodiment, the electronic device 500 may predict a direction for beamforming (e.g., changed sector) based on a sensor angle change, and may resume data communication based on the sector (e.g., sector 1530 with a sector ID of 7) corresponding to the predicted direction. In one embodiment, the electronic device 500 may perform beamforming direction search based on adjacent sectors (e.g., sector ID=6, 7, 8) with respect to the predicted direction.

In various embodiments, to perform the fast SLS operation, the electronic device 500 may determine at least one sector corresponding to a region around the predicted sector ID and perform an SLS operation based on the determined sector.

In various embodiments, the method for adjusting the beam width and the method for searching the predicted beamforming direction based on the existing beamforming direction may be used in combination. For example, the second-stage beam width (second-stage beam 1220 in FIG. 12) may be used to search for the beamforming direction based on adjacent regions with respect to the predicted beamforming direction. In this case, as the range of sectors to be searched is reduced, the search time for the beamforming direction can be shortened.

Figure 16:
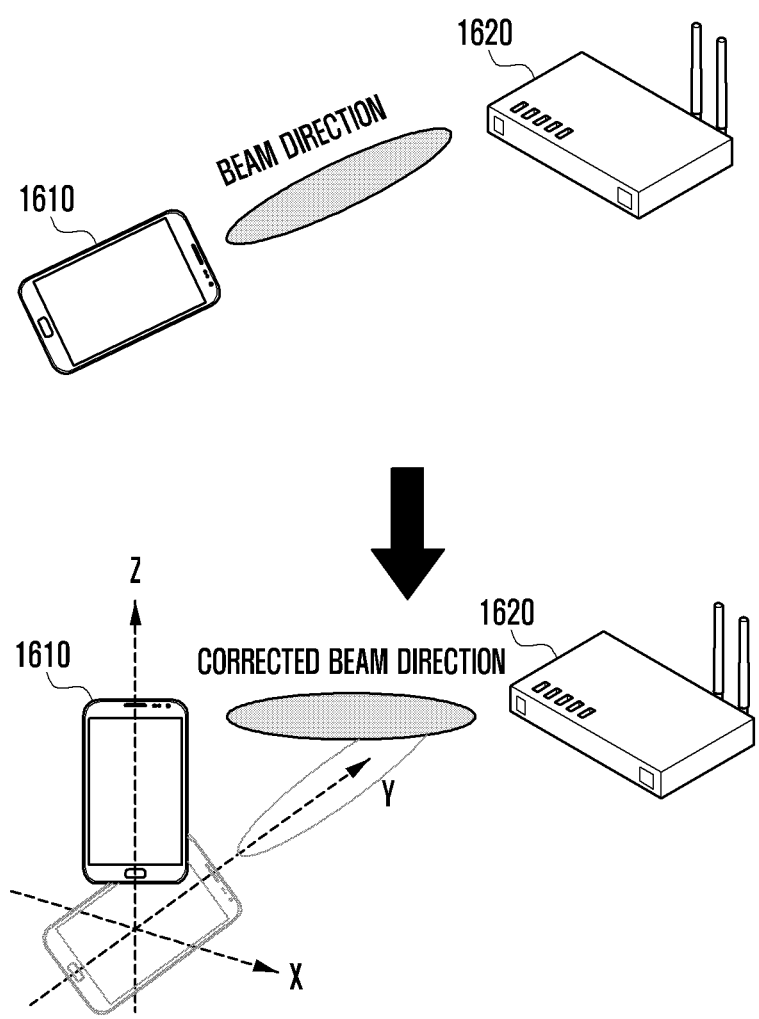
FIG. 16 illustrates a process for an electronic device to adjust the beamforming direction according to various embodiments of the disclosure.

FIG. 16 illustrates a process for an electronic device to adjust the beamforming direction according to various embodiments of the disclosure.

In various embodiments, the electronic device 1610 supporting a millimeter wave system may adaptively select the beam width and rapidly perform beamforming direction search in response to a change in the beamforming direction.

With reference to FIG. 16, the electronic device 1610 (e.g., electronic device 500 in FIG. 5) may perform data communication through an external electronic device 1620 (e.g., access point (AP)) by using a beamforming protocol. When the electronic device 1610 is rotated in a specific direction while performing data communication, the electronic device 1610 may adjust the beamforming direction according to the rotation direction. For example, the electronic device 1610 may check the changed $X_\theta$, $Y_\theta$, and $Z_\theta$ values through the embedded sensor unit (e.g., sensor unit 540 in FIG. 5) and predict the beamforming direction based on the $X_\theta$, $Y_\theta$, and $Z_\theta$ values. As the $X_\theta$, $Y_\theta$, and $Z_\theta$ values may include an error, the electronic device 1610 may perform beamforming direction search based on a specific number of adjacent sectors with respect to the predicted beamforming direction. In one embodiment, as the electronic device 1610 performs beamforming direction search based on a specific number of adjacent sectors with respect to the predicted beamforming direction, the beamforming direction search time can be shortened. In various embodiments, by using the gyro sensor included in the sensor unit 540, the electronic device 1610 may measure an angular velocity for each of the three axes (X, Y, and Z axes). The electronic device 1610 may predict the beamforming direction based on the measured angular velocities and perform beamforming direction search based on a specific number of adjacent sectors with respect to the predicted beamforming direction. The electronic device 1610 may rapidly search for a beamforming direction, and may continue data communication with the external electronic device 1620 based on the found beamforming direction.

Figure 17:
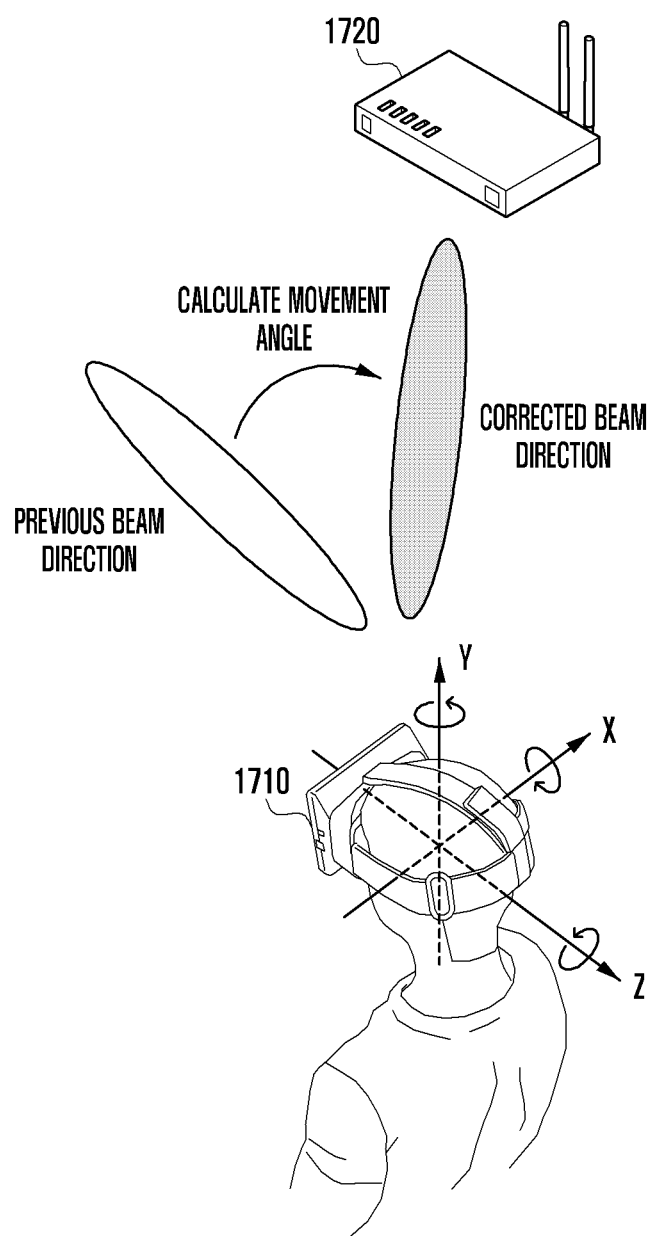
FIG. 17 illustrates a process for a wearable electronic device to adjust the beamforming direction according to various embodiments of the disclosure.

FIG. 17 illustrates a process for a wearable electronic device to adjust the beamforming direction according to various embodiments of the disclosure.

In another embodiment of the disclosure, the head mounted display (HMD) device 1710 supporting data communication based on beamforming may adjust the beamforming direction in response to user's movement and maintain data communication over an external electronic device 1720 (e.g., AP). For example, when the user wearing the HMD device 1710 moves a lot, the HMD device 1710 may increase the beam width and change the beamforming direction according to the direction of the HMD device 1710 predicted based on the sensor information. Thereby, the HMD device 1710 may provide a data communication service to the user in a stable manner.

With reference to FIG. 17, the HMD device 1710 worn by the user may maintain data communication in response to the movement of the user. For example, the user may move significantly while playing a game using the HMD device 1710. The HMD device 1710 may calculate the angle at which the HMD device 1710 is moved based on sensor information obtained through the sensor unit. The HMD device 1710 may predict the changed beamforming direction by calculating the angle based on the previous beamforming direction. As the calculated angle may include an error, the HMD device 1710 may perform beamforming direction search based on a specific number of adjacent sectors around the predicted beamforming direction. Because beamforming direction search is performed based on a specific number of sectors, the beamforming direction search time can be reduced. The HMD device 1710 of another embodiment may predict the beamforming direction based on the obtained sensor information and perform beamforming direction search based on a specific number of adjacent sectors with respect to the predicted beamforming direction. The HMD device 1710 can maintain data communication without interruption or quickly recover data communication through fast beamforming direction search.

Figure 18A:
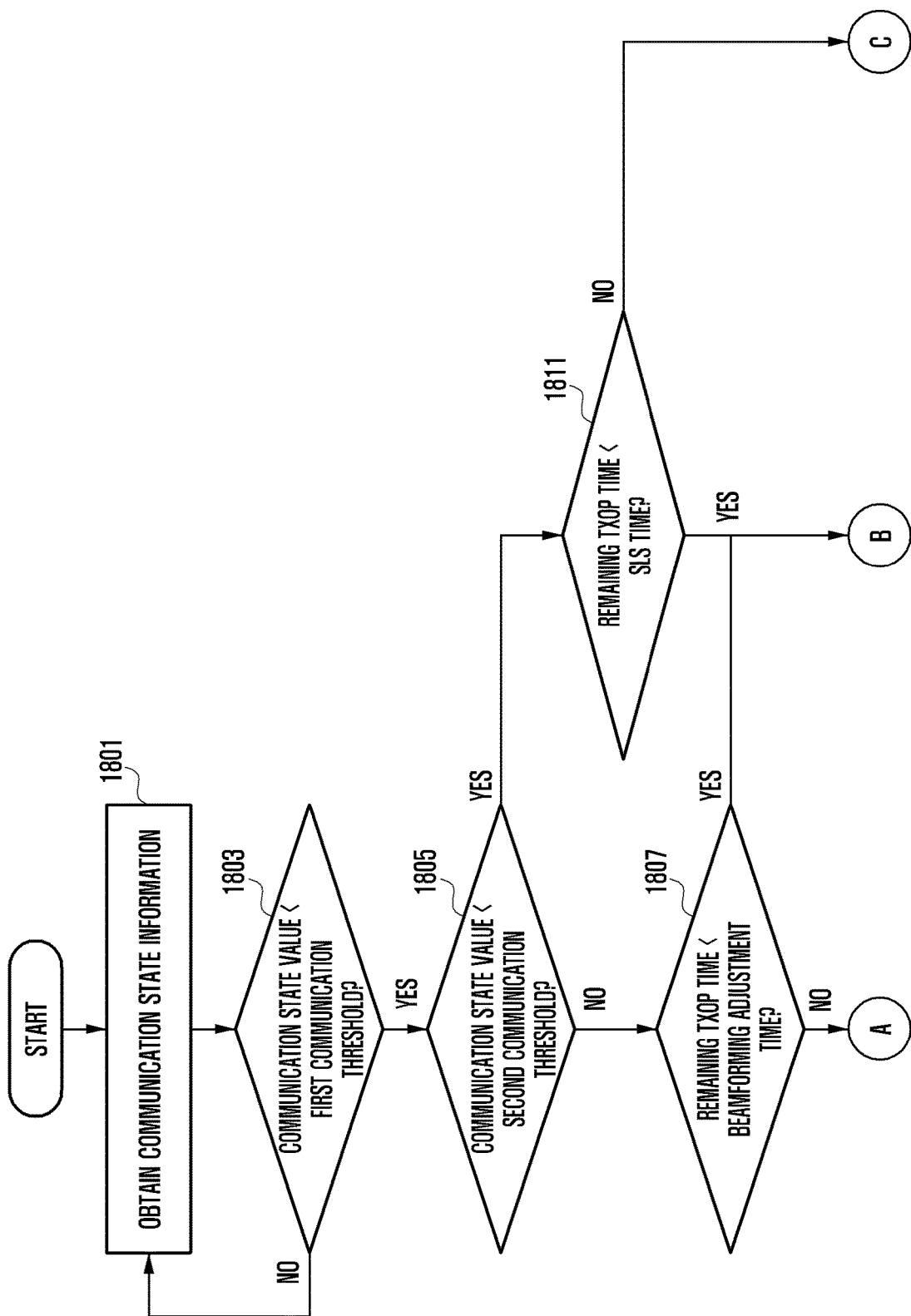
FIGS. 18A and 18B are a flowchart of a method for operating beamforming based on communication state information according to various embodiments of the disclosure.
Figure 18B:
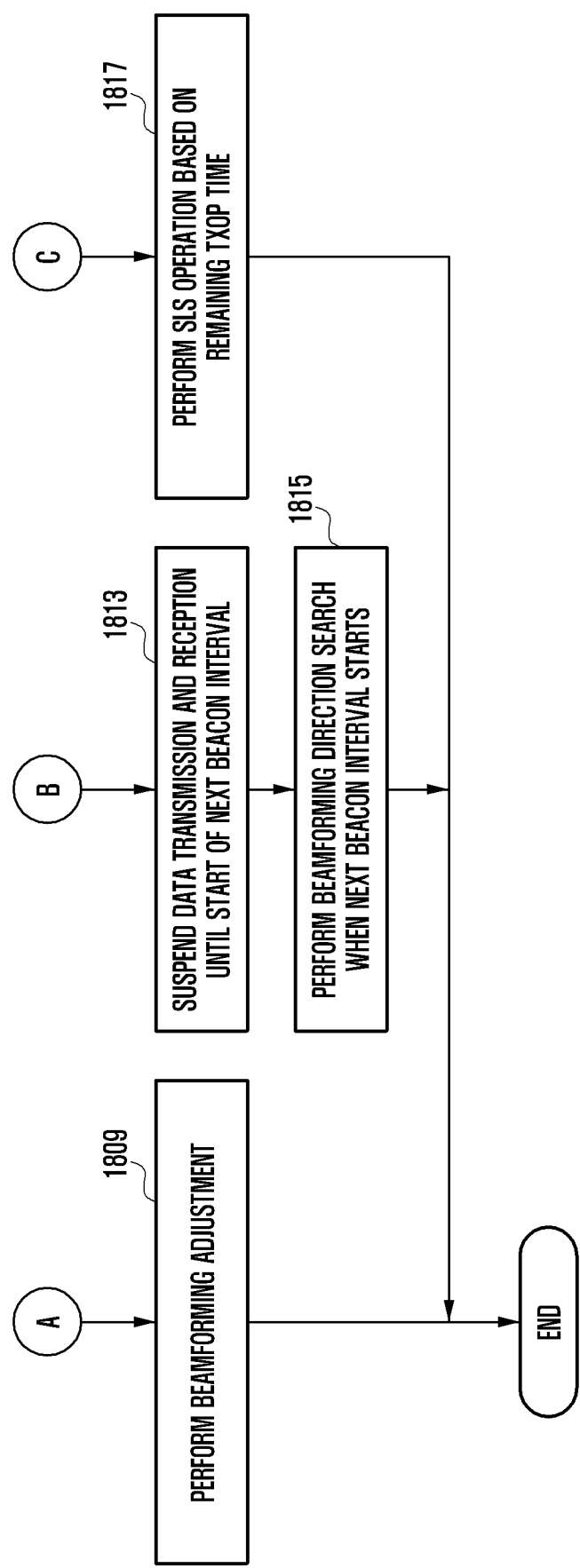

FIGS. 18A and 18B are a flowchart of a method for operating beamforming based on communication state information according to various embodiments of the disclosure.

In various embodiments, the electronic device may adjust the beamforming direction based on the communication state information. The flowchart of FIGS. 18A and 18B is similar to the flowchart of FIGS. 7A and 7B and illustrates a process of adjusting the beamforming direction based on only the communication state information. With reference to FIG. 18A, at operation 1801, the processor (e.g., processor 510) of the electronic device (e.g., electronic device 500 in FIG. 5) may obtain communication state information through the wireless communication circuit (e.g., wireless communication circuit 530 in FIG. 5). The communication state information is used to check the communication performance and may include information about, for example, link speed, MCS index, RSSI, SINR, data rate, or CSI.

At operation 1803, the processor 510 may compare the communication state value calculated based on the obtained communication state information with the first communication threshold corresponding to the communication state information. The processor 510 may determine whether the calculated communication state value is less than the first communication threshold. For example, if the communication state value is less than the first communication threshold, this may mean that the communication performance is deteriorated within a range where beamforming can be adjusted.

At operation 1805, the processor 510 may determine whether the communication state value is less than the second communication threshold. For example, if the communication state value is less than the second communication threshold, this may mean that the communication performance is degraded to a level where beamforming cannot be adjusted.

If the communication state value is greater than the second communication threshold, at operation 1807, the processor 510 may compare the remaining TXOP time with a preset time for beamforming adjustment (beam refinement training). In a typical WLAN, the time required to transmit data once can be determined. Beamforming adjustment may be performed based on a BRP packet included in the data, and the beamforming adjustment time may indicate a time duration for transmitting and receiving data.

If the remaining TXOP time is greater than the beamforming adjustment time, at operation 1809 of FIG. 18B, the processor 510 may perform beamforming adjustment. For example, beamforming adjustment may be performed by adjusting at least some of the beamforming direction based on the BRP packet included in the data. The processor 510 may identify a sector determined according to the beamforming direction before adjustment and adjust the beamforming direction based on the range of the identified sector.

If the communication state value is less than the second communication threshold at operation 1805, at operation 1811, the processor 510 may compare the remaining TXOP time with a SLS time. For example, the SLS time may be a time required to perform an SLS operation. The processor 510 may determine whether the remaining TXOP time is sufficient to perform an SLS operation at operation 1811.

If the remaining TXOP time is less than the SLS time, at operation 1813, the processor 510 may suspend data transmission and reception until the start of the next beacon interval.

After suspending data transmission and reception, at operation 1815, the processor 510 may perform beamforming direction search when the next beacon interval starts. For example, the processor 510 may perform beamforming direction search corresponding to the SLS operation using the SLS protocol. When determining the beamforming direction through beamforming direction search, the processor 510 may resume the suspended data transmission and reception.

If the remaining TXOP time is greater than the SLS time at operation 1811, at operation 1817, the processor 510 may perform an SLS operation for the remaining TXOP time. For example, the processor 510 may identify a sector corresponding to the current beamforming direction and perform an SLS operation based on the identified sector.

In various embodiments, the electronic device 500 may adjust the beamforming direction based on the communication state information.

According to various embodiments of the disclosure, a method for communication control may include: performing a first direction search to determine the direction of the directional beam corresponding to a first section associated with a range corresponding to the direction of the electronic device 500; obtaining communication state information and sensor information; detecting a change in the direction of the electronic device 500 based on the communication state information and sensor information; and performing, upon detecting a change in the direction, a second direction search corresponding to a second section at least partially based on the detected direction change of the electronic device 500. The second section is associated with a range corresponding to the changed direction of the electronic device 500 and the second section is smaller in range than the first section.

In various embodiments, the communication control method may further include determining the direction of the directional beam based on the result of the second direction search and establishing a wireless communication channel according to the determined beam direction.

In various embodiments, the communication control method may further include monitoring the performance of a wireless communication channel corresponding to the first section and the second section and determining whether to perform the second direction search at least partially based on the monitored performance or a change therein.

In various embodiments, the communication control method may further include, in a case where a first condition is satisfied when a change in the direction of the electronic device 500 within the range of the first section is detected and a second condition is satisfied when a change in the direction of the electronic device 500 outside the range of the first section is detected, performing, upon satisfaction of the first condition, the second direction search corresponding to the first section at least partially based on the detected direction change.

In various embodiments, the communication control method may further include, upon satisfaction of the second condition: suspending data communication through the wireless communication circuit; performing the second direction search corresponding to the second section; determining the beam direction based on the result of the second direction search; and resuming the suspended data communication according to the determined beam direction.

In various embodiments, the width of the directional beam for the first direction search and the second direction search may be set by the user. The first direction search and the second direction search may be performed using at least one antenna embedded in the electronic device 500.

In various embodiments, the second section may be formed corresponding to the peripheral angular velocity with respect to the angular velocity corresponding to the first section.

The term "module" as used herein may include a unit consisting of hardware, software, or firmware, and may, for example, be used interchangeably with the term "logic", "logical block", "component", "circuit", or the like. The "module" may be an integrated component or a minimum unit for performing one or more functions or a part thereof. The "module" may be implemented mechanically or electronically, and may include, for example, an Application-Specific Integrated Circuit (ASIC) chip, a Field-Programmable Gate Array (FPGA), or a programmable logic device, which is known or is to be developed in the future, for performing certain operations. At least some of devices (e.g., modules or functions thereof) or methods (e.g., operations) according to various embodiments may be implemented as instructions which are stored a computer-readable storage medium (e.g., the memory 130) in the form of a program module. If the instructions are executed by a processor, the processor may perform a function corresponding to the instructions. The computer-readable storage medium may include a hard disk, a floppy disk, a magnetic medium (e.g., a magnetic tape), optical media (e.g., CD-ROM, DVD), magneto-optical media (e.g., a floptical disk), internal memory, etc. The instructions may include code compiled by a complier or code that can be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

The invention claimed is:

1. An electronic device comprising:
a housing including a first surface and a second surface facing the first surface;
a touchscreen display exposed through the first surface;
a wireless communication circuit configured to generate a directional beam to establish a wireless communication channel with an external electronic device;
a sensor embedded in the housing;
at least one processor embedded in the housing and electrically connected to the touchscreen display, the wireless communication circuit, and the sensor; and
a memory embedded in the housing and electrically connected to the at least one processor,
wherein the memory stores instructions that, when executed, cause the processor to:
perform a first direction search to determine the direction of the directional beam corresponding to a first section wherein the first section is associated with a range corresponding to the direction of the electronic device;
detect a change in the direction of the electronic device by using the wireless communication circuit and the sensor;
adjust, when the change in the direction of the electronic device within the range of the first section is detected, upon satisfaction of a first condition, the direction of the directional beam corresponding to the first section at least partially;
suspend, when the change in the direction of the electronic device outside the range of the first section is detected, upon satisfaction of a second condition, data communication through the wireless communication circuit;
perform a second direction search corresponding to a second section at least partially based on the detected direction change;
determine a beam direction based on the result of the second direction search; and
resume the suspended data communication according to the determined beam direction,
wherein the second section is associated with a range corresponding to the changed direction of the electronic device and the second section is smaller in range than the first section.

2. The electronic device of claim 1, wherein the instructions are configured to cause the processor to monitor the performance of the wireless communication channel and determine whether to perform the second direction search at least partially based on the performance or a change in the performance.

3. The electronic device of claim 1, wherein the wireless communication circuit is configured to support the IEEE 802.11ad standard, and wherein the instructions are configured to cause the processor to perform the first direction search during an association beamforming training (A-BFT) interval of a beacon interval specified in the IEEE 802.11ad standard.

4. The electronic device of claim 3, wherein the instructions are configured to cause the processor to perform the second direction search during a data transmission interval (DTI) of the beacon interval specified in the IEEE 802.11ad standard when the direction of the directional beam is out of a preset range.

5. The electronic device of claim 1, wherein the instructions are configured to cause the processor to:
detect the change in the direction of the electronic device based on communication state information obtained through the wireless communication circuit and sensor information obtained through a sensor unit;
determine the direction of the directional beam based on the result of the second direction search; and
establish the wireless communication channel through the wireless communication circuit based on the determined beam direction.

6. The electronic device of claim 5, wherein the instructions are configured to cause the processor to:
determine, upon determining to perform the second direction search, whether it is possible to perform the second direction search during a remaining time of the DTI of a beacon interval specified in the IEEE 802.11ad standard;
perform the second direction search during the remaining time of the DTI if possible; and
perform the second direction search during an A-BET interval of the next beacon interval if otherwise.

7. The electronic device of claim 5, wherein a width of the directional beam for the first direction search and the second direction search is set by a user, and wherein the first direction search and the second direction search are performed by using at least one antenna embedded in the housing.

8. The electronic device of claim 5, wherein the second section is formed corresponding to a peripheral angular velocity with respect to an angular velocity corresponding to the first section.

9. A method for communication control, the method comprising:
- performing a first direction search to determine the direction of a directional beam corresponding to a first section associated with a range corresponding to the direction of an electronic device;
- obtaining communication state information and sensor information;
- detecting a change in the direction of the electronic device based on the communication state information and sensor information;
- adjusting, when the change in the direction of the electronic device within the range of the first section is detected, upon satisfaction of a first condition, the direction of the directional beam corresponding to the first section at least partially;
- suspending, when the change in the direction of the electronic device outside the range of the first section is detected, upon satisfaction of a second condition, data communication through a wireless communication circuit;
- performing a second direction search corresponding to a second section at least partially based on the detected direction change of the electronic device;
- determining a beam direction based on the result of the second direction search; and
- resuming the suspended data communication according to the determined beam direction,
- wherein the second section is associated with a range corresponding to the changed direction of the electronic device and is smaller in range than the first section.

10. The method of claim 9, further comprising:
- determining the direction of the directional beam based on the result of the second direction search; and
- establishing a wireless communication channel according to the determined beam direction.

11. The method of claim 9, further comprising:
- monitoring the performance of a wireless communication channel corresponding to the first section and the second section; and
- determining whether to perform the second direction search at least partially based on the monitored performance or a change in the performance.

* * * * *